United States Patent
Hyer, Jr. et al.

(10) Patent No.: US 8,301,673 B2
(45) Date of Patent: Oct. 30, 2012

(54) SYSTEM AND METHOD FOR PERFORMING DISTRIBUTED CONSISTENCY VERIFICATION OF A CLUSTERED FILE SYSTEM

(75) Inventors: Robert Wyckoff Hyer, Jr., Seven Fields, PA (US); Todd Derr, Pittsburgh, PA (US); John K. Edwards, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 321 days.

(21) Appl. No.: 11/966,591

(22) Filed: Dec. 28, 2007

(65) Prior Publication Data
US 2008/0189343 A1   Aug. 7, 2008

Related U.S. Application Data

(60) Provisional application No. 60/877,920, filed on Dec. 29, 2006.

(51) Int. Cl.
G06F 7/00 (2006.01)
G06F 17/30 (2006.01)
G06F 12/00 (2006.01)

(52) U.S. Cl. ......... 707/822; 707/812; 707/769; 711/111

(58) Field of Classification Search .................. None
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |

(Continued)

FOREIGN PATENT DOCUMENTS

JP   10003440   6/1998

(Continued)

OTHER PUBLICATIONS

Administration Guide found at http://www.openafs.org/pages/doc/AdminGuide/auagd010.htm, visited on Mar. 2, 2005, 34 pages.

(Continued)

Primary Examiner — Loan T Nguyen
(74) Attorney, Agent, or Firm — Cesari and McKenna, LLP

(57) ABSTRACT

A system and method for performing a distributed consistency check of a clustered file system. File system functions for loading an inode and/or buffer tree are modified so that in response to either of these functions being invoked, a consistency check is performed. The consistency check verifies both local consistency on a node of the clustered file and a distributed check across the nodes of the storage system.

42 Claims, 20 Drawing Sheets

U.S. PATENT DOCUMENTS

| | | | |
|---|---|---|---|
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,426,747 | A | 6/1995 | Weinreb et al. |
| 5,485,579 | A | 1/1996 | Hitz et al. |
| 5,511,177 | A | 4/1996 | Kagimasa et al. |
| 5,568,629 | A | 10/1996 | Gentry et al. |
| 5,581,724 | A | 12/1996 | Belsan et al. |
| 5,701,516 | A | 12/1997 | Cheng et al. |
| 5,764,972 | A | 6/1998 | Crouse et al. |
| 5,802,366 | A | 9/1998 | Row et al. |
| 5,819,292 | A * | 10/1998 | Hitz et al. ............................. 1/1 |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,032,216 | A | 2/2000 | Schmuck et al. |
| 6,038,570 | A | 3/2000 | Hitz et al. |
| 6,061,770 | A | 5/2000 | Franklin |
| 6,065,037 | A | 5/2000 | Hitz et al. |
| 6,081,875 | A | 6/2000 | Clifton et al. |
| 6,128,627 | A | 10/2000 | Mattis et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 | 5/2001 | Schneider et al. |
| 6,275,898 | B1 | 8/2001 | DeKoning |
| 6,324,581 | B1 | 11/2001 | Xu et al. |
| 6,341,341 | B1 | 1/2002 | Grummon et al. |
| 6,397,311 | B1 | 5/2002 | Capps et al. |
| 6,425,035 | B2 | 7/2002 | Hoese et al. |
| 6,457,021 | B1 | 9/2002 | Berkowitz et al. |
| 6,502,166 | B1 | 12/2002 | Cassidy |
| 6,516,380 | B2 | 2/2003 | Kenchammana-Hoskote et al. |
| 6,564,228 | B1 * | 5/2003 | O'Connor ............................. 1/1 |
| 6,564,252 | B1 | 5/2003 | Hickman et al. |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,732,124 | B1 | 5/2004 | Koseki et al. |
| 6,804,706 | B2 | 10/2004 | Pitts |
| 6,868,417 | B2 | 3/2005 | Kazar et al. |
| 6,931,450 | B2 | 8/2005 | Howard et al. |
| 6,978,283 | B1 | 12/2005 | Edwards et al. |
| 7,010,528 | B2 | 3/2006 | Curran et al. |
| 7,127,577 | B2 | 10/2006 | Koning et al. |
| 7,159,093 | B2 | 1/2007 | Dalal et al. |
| 7,162,486 | B2 | 1/2007 | Patel et al. |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,386,546 | B1 | 6/2008 | Santry et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 7,590,807 | B2 | 9/2009 | McGovern et al. |
| 7,730,258 | B1 * | 6/2010 | Smith et al. .................... 711/114 |
| 2002/0049883 | A1 | 4/2002 | Schneider et al. |
| 2002/0118693 | A1 * | 8/2002 | Calvignac et al. ............ 370/422 |
| 2003/0188045 | A1 | 10/2003 | Jacobson |
| 2004/0030668 | A1 | 2/2004 | Pawlowski et al. |
| 2004/0122917 | A1 | 6/2004 | Menon et al. |
| 2004/0133570 | A1 | 7/2004 | Soltis |
| 2004/0139167 | A1 | 7/2004 | Edsall et al. |
| 2005/0097260 | A1 | 5/2005 | McGovern et al. |
| 2005/0192932 | A1 | 9/2005 | Kazar et al. |
| 2006/0184587 | A1 | 8/2006 | Federwisch et al. |
| 2006/0184731 | A1 | 8/2006 | Corbett et al. |
| 2007/0088702 | A1 | 4/2007 | Fridella et al. |

FOREIGN PATENT DOCUMENTS

| | | |
|---|---|---|
| WO | WO 89/10594 | 11/1989 |
| WO | WO 00/07101 | 2/2000 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Asante Desktop EN/SC Adapters User's Manual Apr. 1996, 29 pages.

Asante EN/SC Adapter Family Installation Guide May 1994, 60 pages.

Auspex Systems, LFS—A Local File System for Multiprocessor NFS Network Servers, 1994, 6 pages.

Basilico, et al., Error Correction System Using "Shadow Memory," IBM Technical Disclosure Bulletin, May 1984, pp. 5792-5793.

Bhattacharya, Supama et al., "Coordinating Backup/Recovery and Data Consistency between Database and Files Systems", ACM, Jun. 2002, pp. 500-511.

Bitton, Dina, Disk Shadowing, Proceedings of the 14.sup.th VLDB Conference, LA, CA (1988), 8 pages.

Blasgen, M.W. et al., System R: An architectural Overview, Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brown, Mark R. et al., The Alpine file system, ACM Transactions on Computing Systems, 3(4):261-293, Nov. 1985.

Callaghan, B., "NFS Version 3 Protocol Specification", Request for Comments (RFC) 1813 Jun. 1995, 118 pages.

Celerra File Server Architecture for High Availability, EMC2 where information lives, Aug. 1999, 12 pages.

Chaudhuri, Surajit, et al., Self-Tuning Technology in Microsoft SQL Server, Data Engineering Journal 22, Feb. 1999 pp. 20-27.

Chen, Peter M. et al., An Evaluation of Redundant Arrays of Disks Using an Amdahl 5890 Peformance Evaluation, pp. 74-85, 1990.

Chutani, Sailesh, et al., The Episode File System, In Proceedings of the USENIX Winter 1992, 18 pages.

Clark, B.E., et al., Application System /400 Performance Characteristics, IBM Systems Journal, 28(3):407-423, 1989.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Coyne, Robert A., et al., Storage Systems for National Information Assets, Proc. Supercomputing 92, Minneapolis, Nov. 1992, pp. 626-633.

Data Sheet for the Check Point Software Technologies product Flood-Gate-1 (1997), 8 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Fielding et al., (1999) Request for Comments (RFC) 2616, HTTP/1.1, 144 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hecht, Matthew S., et al. Shadowed Management of Free Disk Pages with a Linked List, ACM Transactions on Database Systems, 8/4, Dec. 1983, pp. 503-514.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer System., 6(1), Feb. 1988 pp. 51-81.

The IBM System/38, Chapter 8, 1984, pp. 137-157.

International Search Report PCT/US03/23597, Apr. 14, 2004, 8 pages, International Searching Authority, Alexandria, Virginia, USA.

Isomaki, Markus, Differentiated Service for the Internet, Department of Technical Physics and Mathematics, May 9, 1998, 17 pages.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages, 1988.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Levine, Ron and Michelle Gervais, Building a SAN, SunExpert Magazine, Mar. 1999, pp. 50-64.

Lomet, David., et al., The performance of a multiversion access method, ACM SIGMOD International Conference on Management of Data, 19:353-363, 1990.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

Maintenance Procedures ND (8C) nd-network disk control Feb. 1985, 1 page.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Misc. Reference Manual Pages ND (4P) nd-network disk driver Jul. 26, 1985, 3 pages.

Moons, Herman et al., Location-Independent Object Invocation in Open Distributed Systems, Autumn 1991 EurOpen Technical Conference and Exhibition, pp. 287-300 (Sep. 16-20, 1991).

Morris, James H., et al., Andrew: A Distributed Personal Computing Environment, Comm. of the ACM, vol. 29, Mar. 1986, pp. 184-201.

Mullender, Sape J., et al., A distributed file service based on optimistic concurrency control, ACM Symposium on Operating System Principles (Orcas Island, Washington). Published as Operating Systems Review, 19(5):51-62, Dec. 1985.

Muller, Keith, et al., A High Performance Multi-Structured File System Design, In Proceedings of the 13th ACM Symposium on Operating Systems Principles, Oct. 1991, pp. 56-67.

Nelson, Michael et al., "Caching in the Sprite Network File System", ACM, Nov. 1987, pp. 3-4.

Network Appliance ends NAS-SAN war by Computerwire, http://www.theregister.co.uk/2002/10/102/network.sub.—appliance.sub.—en-ds.sub.—nassan.sub.—war/print.html, Published Wednesday, Oct. 2, 2002, 2 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Performance Without Compromise: The Virtual Storage Architecture 1997, 11 pages.

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC, 1990, 5 pages.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Schiefer, Berni, et al., DB2 Universal Database Performance Tuning, Data Engineering Journal 22, Feb. 1999 pp. 12-19

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.
Unix Workstation System Administration Education Certification Course, Jan. 8, 2002, 22 pages.
User Guide found at http://www.openafs.org/pages/doc/UserGuide/auusg004.htm, visited on Mar. 2, 2005, 8 pages.
Weikum, Gerhard, et al., Towards Self-Tuning Memory Management for Data Servers, Data Engineering Journal 22, Feb. 1999 pp. 3-11.
Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.
Welch, Brent B., et al., Pseudo-File-Systems, Computer Science Division, Department of Electrical Engineering and Computer Sciences, Univ. of CA, Berkley, Oct. 1989, 22 pages.
West, Michael, et al. The ITC Distributed File System: Prototype and Experience, Carnegie-Mellon University, Technical Report CMU-ITC-040, Mar. 1985, 17 pages.
Wittle, Mark, et al., LADDIS: The next generation in NFS file server benchmarking, USENIX Association Conference Proceedings, Apr. 1993, 29 pages.
Zayas, Edward R., AFS-3 Programmer's Reference: Architectural Overview, Transarc Corporation, Pittsburgh, PA, 1.0 edition 1991, 37 pages.
Carns, P. H., et al, "PVFS: A Parallel File System for Linux Clusters", Proceedings of the 4.sup.th Annual Linux Showcase and Conference, Atlanta, GA, Oct. 2000, pp. 317-327.
Hartman, J. H., et al., "Zebra: A Striped Network File System" Proceedings of the Usenix File Systems Workshop, Apr. 1998 pp. 1-9, XP002926950.
Hartman, J. H., et al. "The Zebra Striped Network File System" Dec. 1, 1993, Operating Systems Review, ACM, New York, NY, US, pp. 29-43, XP000418681, Issn: 0163-5908.
Ligon, W. B. III, et al., "Implementation and Performance of a Parallel File System for High Performance Distributed Application", Proceedings of the fifth IEEE International Symposium on High Performance Distributed Computing, Aug. 1996, 10 pages.
Network Appliance, Inc., Notification of Transmittal of the International Search Report and the Written Opinion of the International Searching Authority, or the Declaration, international Application No. PCT/US2005/031220, International Filing Date Sep. 1, 2005, Date of Mailing Oct. 18, 2006, 12 pages.
Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.
Ross, R. B. et al., "Using the Parallel Virtual File System", Jul. 2002, 31 pages.
Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.
Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.
"Notification of Transmittal of the International Search Reoprt and the Written Opinion of the International Searching Authority, or the Declaration", International Application No. PCT/US2006/016055, International Filing Date Apr. 27, 2006, Mailing Date Nov. 9, 2006, 10 pages.
Brinkmann et al., "Efficient, Distributed Data Placement Strategies for Storage Area Networks", Proc. of the 12th ACM Symp. on Parallel Algorithms and Architectures (SPAA), ACM Press. 2000, pp. 119-128.
Ganger, Gregory R. et al., "Disk Subsystem Load Balancing: Disk Striping vs. Coventional Data Placement", Department of Electrical Engineering and Computer Science, University of Michigan, Ann Arbor, Jan. 5, 1993, 10 pages.
Honicky, R.J. et al., "A Fast Algorith for Online Placement and Reorganization of Replicated Data", Storage Systems Research Center, University of California, Santa Cruz, Apr. 22, 2003, 10 pages.
Ho, T.K. et al., "A Row Permutated Data Reorganization Algorithm for Growing Server-less Video-on-demand Systems", Department of Information Engineering, the Chinese University of Hong Kong, Shatin, N.T., Hong Kong, May 12, 2003, 8 pages.
Hyer et al., "System and Method for Performing Distributed Consistency Verification of a Clustered File System", U.S. Appl. No. 60/877,920, filed Dec. 29, 2006, 62 pages.

* cited by examiner

SYSTEM AND METHOD FOR PERFORMING DISTRIBUTED CONSISTENCY VERIFICATION OF A CLUSTERED FILE SYSTEM

RELATED APPLICATION

The present invention claims priority to U.S. Provisional Patent Application Ser. No. 60/877,920, filed Dec. 29, 2006, entitled SYSTEM AND METHOD FOR PERFORMING DISTRIBUTED CONSISTENCY VERIFICATION OF A CLUSTERED FILE SYSTEM, by Hyer Jr., et al., the contents of which are hereby incorporated by reference.

FIELD OF THE INVENTION

The present invention relates to clustered computer environments and, more particularly, to performing a consistency check of a clustered file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that data container may exceed its processing resources and become overburdened, with a concomitant degradation of speed and performance.

One technique for overcoming the disadvantages of having a single data container that is heavily utilized is to stripe the data container across a plurality of volumes configured as a striped volume set (SVS), where each volume is serviced by a different storage system, thereby distributing the load for the single data container among a plurality of storage systems. A technique for data container striping is described in U.S. Pat. No. 7,698,289, entitled STORAGE SYSTEM ARCHITECTURE FOR STRIPING DATA CONTAINER CONTENT ACROSS VOLUMES OF A CLUSTER, by Richard Jernigan, et al., issued on Apr. 13, 2010, the contents of which are hereby incorporated by reference.

Known storage operating systems typically contain a function, such as a program or command to check and/or repair (i.e. "verify") an associated file system. Examples of such file system verification functions include the conventional UNIX-based fsck program and the checkdisk command on Microsoft Windows®-based systems. These known file system verification functions typically execute while the file system being verified is offline. By "offline" it is meant that the file system is not available for data access by users of the file system.

In known examples, a file system verification function is executed when a user believes that there is a problem with the file system, e.g., a crash or other file system failure has occurred. However, a noted disadvantage of known file system verification functions is the substantial amount of time required to perform the verification. As the file system is offline and therefore unavailable for data access by users, this verification time results in a prolonged period in which the data stored in a file system is unavailable to users.

In storage systems involving a multi-node cluster configuration, such as that described in the above-referenced United States Patent Application entitled STORAGE SYSTEM ARCHITECTURE FOR STRIPING DATA CONTAINER CONTENT ACROSS VOLUMES OF A CLUSTER, additional complexity arises in ensuring that the file system is consistent. Individual verifications of each volume may return a consistent state, however, the overall striped volume arrangement may remain inconsistent. Thus, a need arises for ensuring the consistency of a SVS.

SUMMARY OF THE INVENTION

The present invention overcomes the disadvantages of the prior art by providing a system and method for performing distributed consistency verification of a clustered file system, configured to service a striped volume set (SVS). Illustratively, the SVS is implemented as a plurality of volumes within a clustered storage system comprising a plurality of nodes. A storage operating system executes on the nodes to implement the clustered file system. In the illustrative embodiment, storage operating system functions that load selected objects, such as inodes (Load_Inode( ) and/or buffer trees (Load_Buffer( )), are modified so that before an inode and/or buffer tree is returned to a process calling the loading function, a procedure is performed to verify the inode and any related buffer trees of a volume within the SVS as well as ensuring that the SVS is consistent with respect to the inode. The verification procedure may also repair predetermined problems with file system consistency to ensure that the file system remains stable and useable.

When the process executing within the storage operating system calls either Load_Inode( ) or Load_Buffer( ), the modified function suspends return of the selected object until the verification procedure is performed. First, a determination is made whether a local volume consistency verification has been performed, i.e., whether the local volume is consistent regardless of the overall consistency of the SVS. If the local volume consistency verification has not been performed, then the verification procedure loads the selected inode or buffer tree and determines if it is associated with a regular file or directory. If, for example, the selected inode is a regular file inode, the verification procedure checks the associated buffer tree of the inode. This procedure insures that the buffer tree has valid pointers and that any given block does not have multiple pointers to it, as well as other file system coherency checks. The verification procedure may also correct noted errors in the file system. If the selected inode is a directory inode, the verification procedure performs a directory check.

Once the local volume consistency verification has been performed, a distributed consistency verification is performed to ensure that the selected inode is consistent among all of the constituent volumes of the SVS. The distributed consistency verification is illustratively implemented by a set of verification processes executing as part of the storage operating system.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
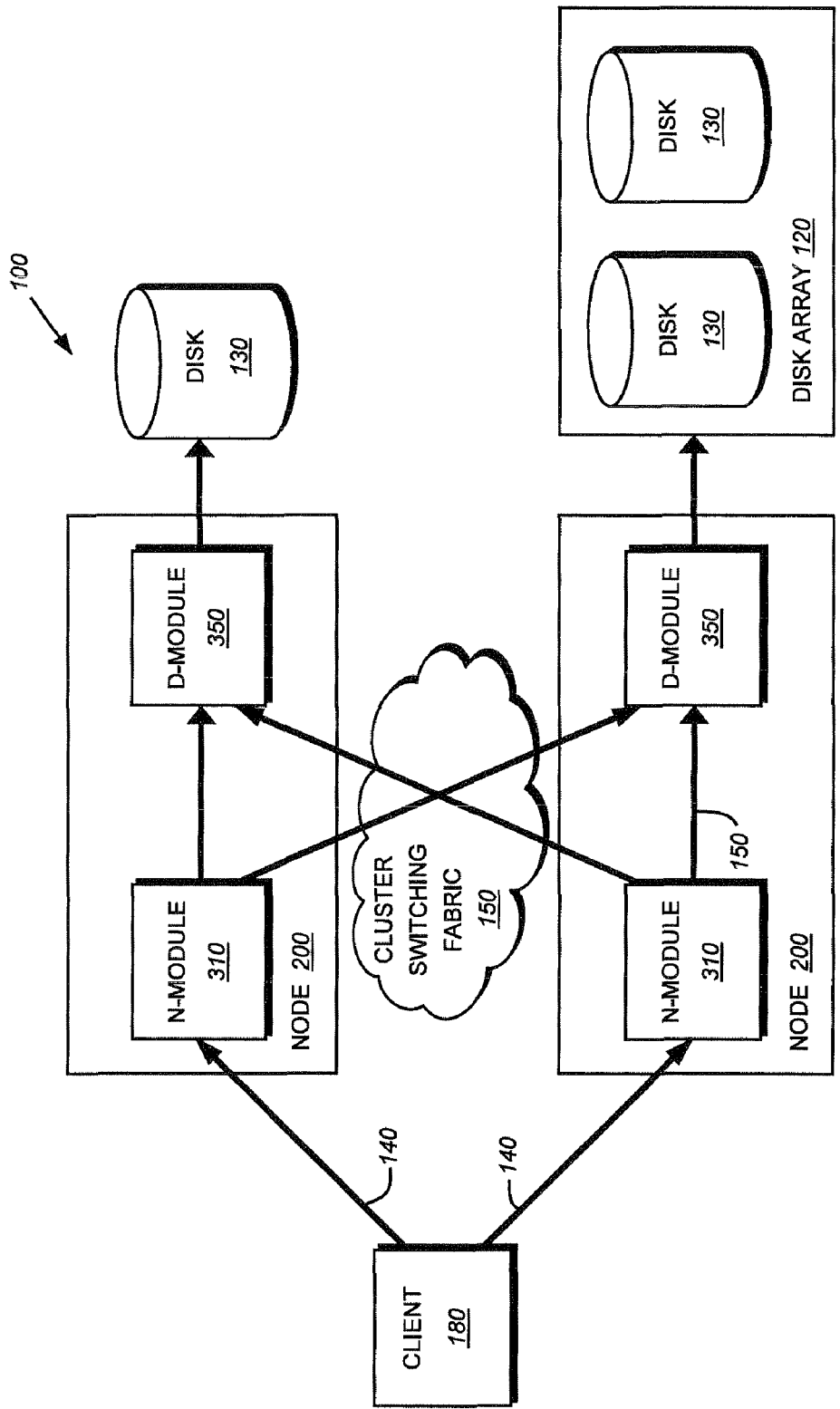
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
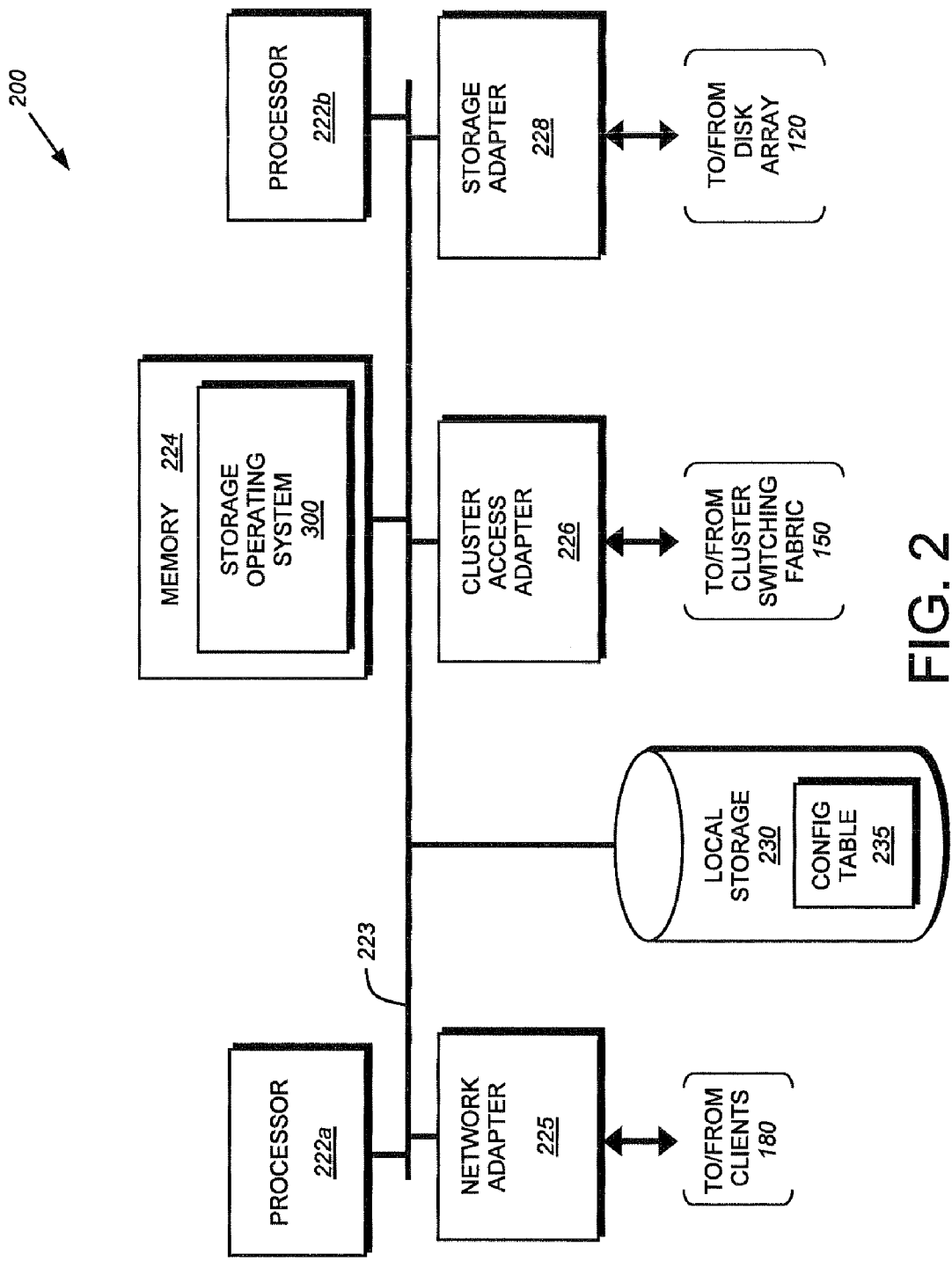
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100. Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks, on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
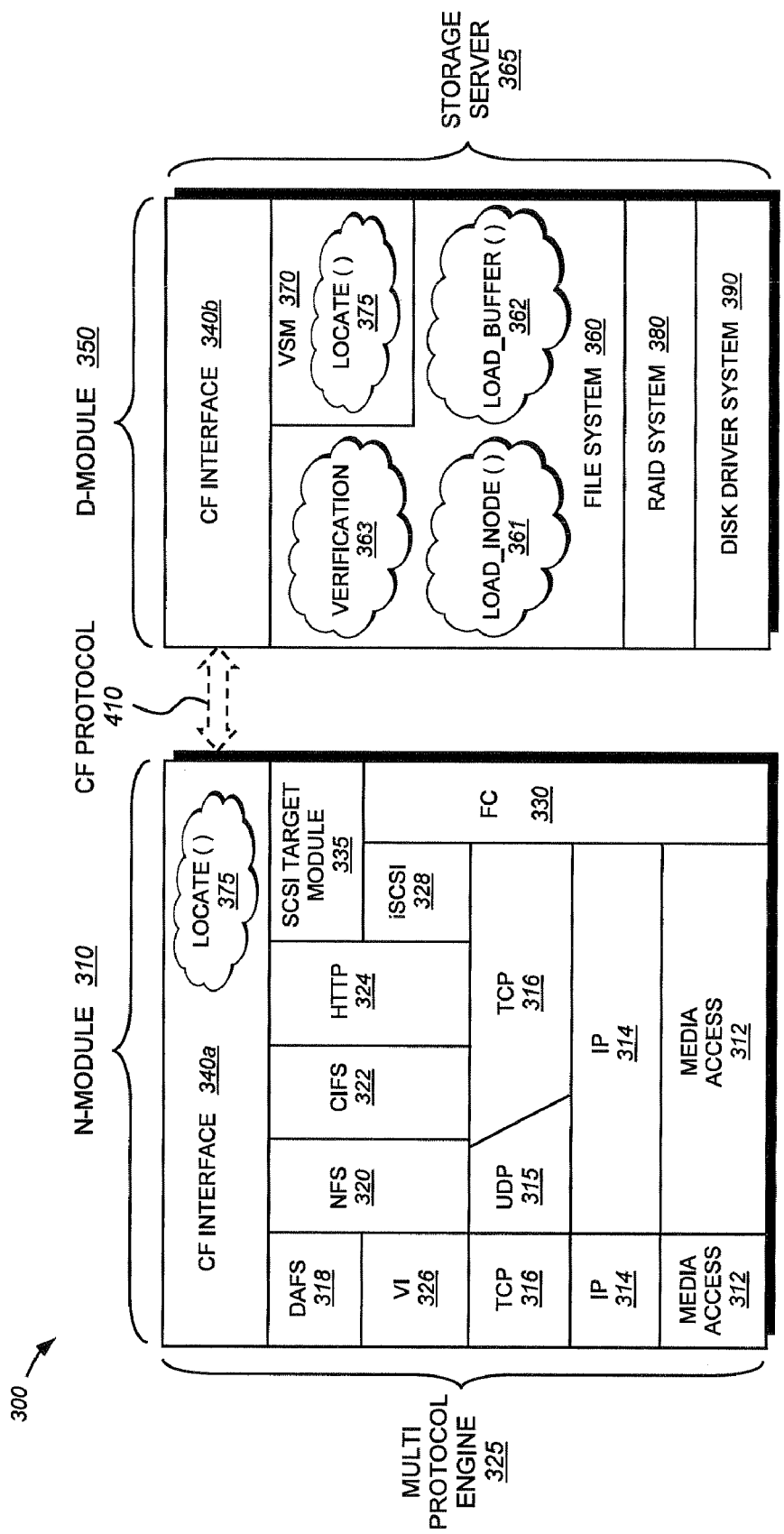
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) within a storage system cluster. As described further herein, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

A set of verification processes 363 is also contained within the file system 360. The verification checking processes 363 illustratively implement file system operations of a verification procedure according to the present invention. Additionally, the file system 360 includes a function that loads inodes (Load_Inode( )) 361 and a function that loads buffer trees (Load_Buffer( )) 362. In accordance with an illustrative embodiment of the present invention, the Load_Inode( ) 361 and Load_Buffer( ) 362 functions are modified to perform verification operations whenever an inode and/or buffer tree is loaded by the file system 360. The modified Load_Inode( ) 361 and Load_Buffer( ) 362 functions cooperate with the verification processes 363 to illustratively implement the present invention, as discussed further herein.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. Illustratively, indexing into the inode file is performed via the load inode function, which causes retrieval of a selected inode from the inode file for use in examining metadata associated therewith. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
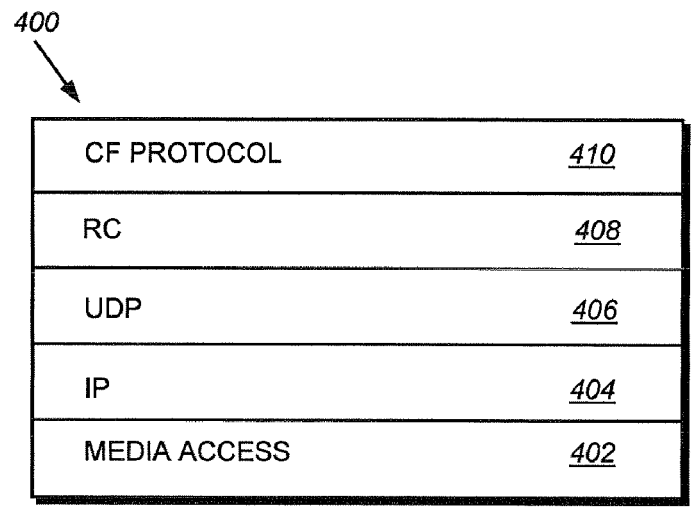
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
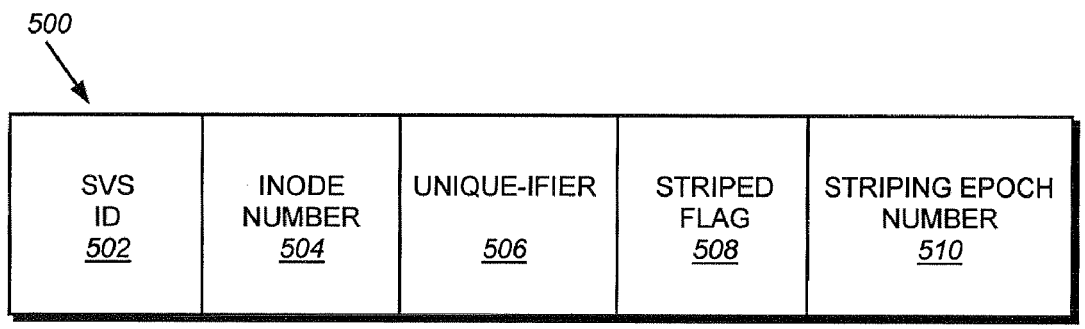
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
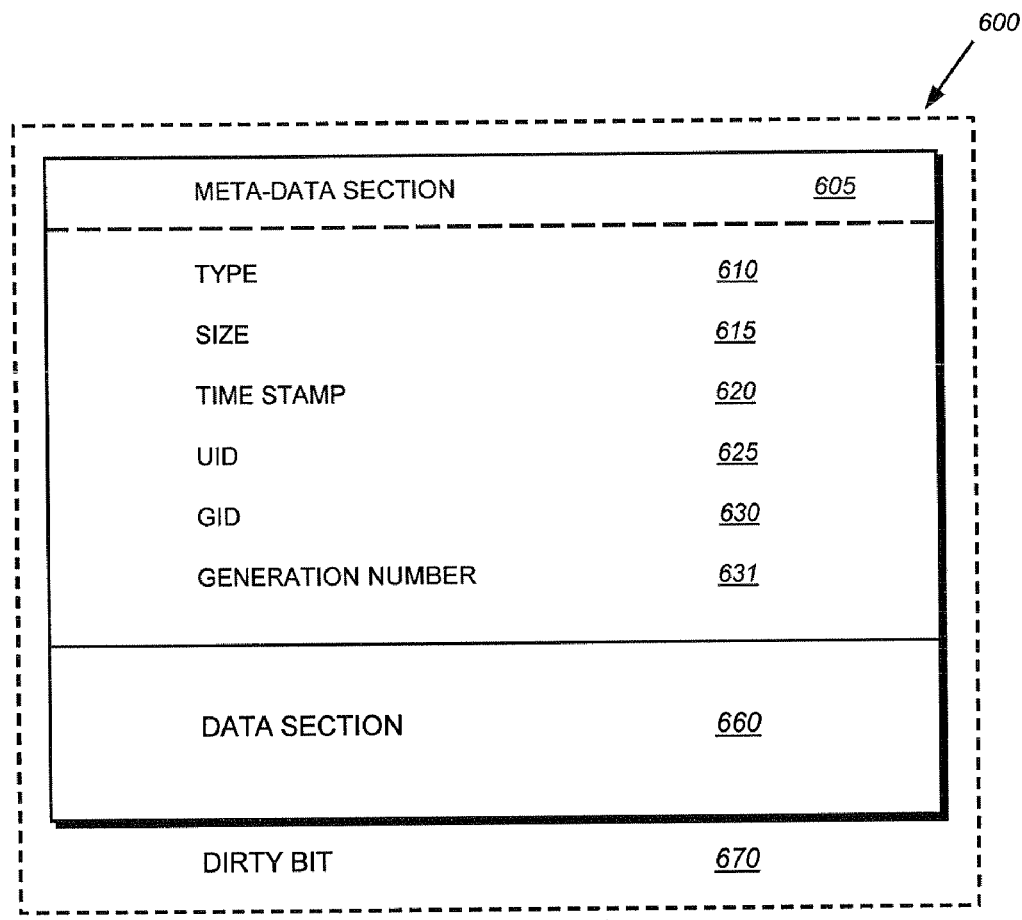
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
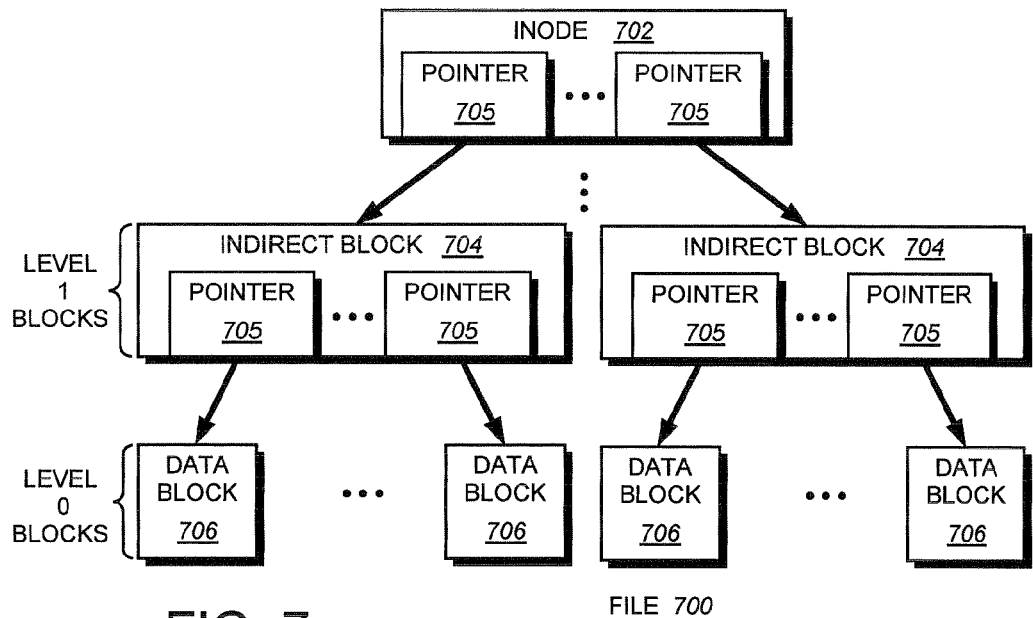
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
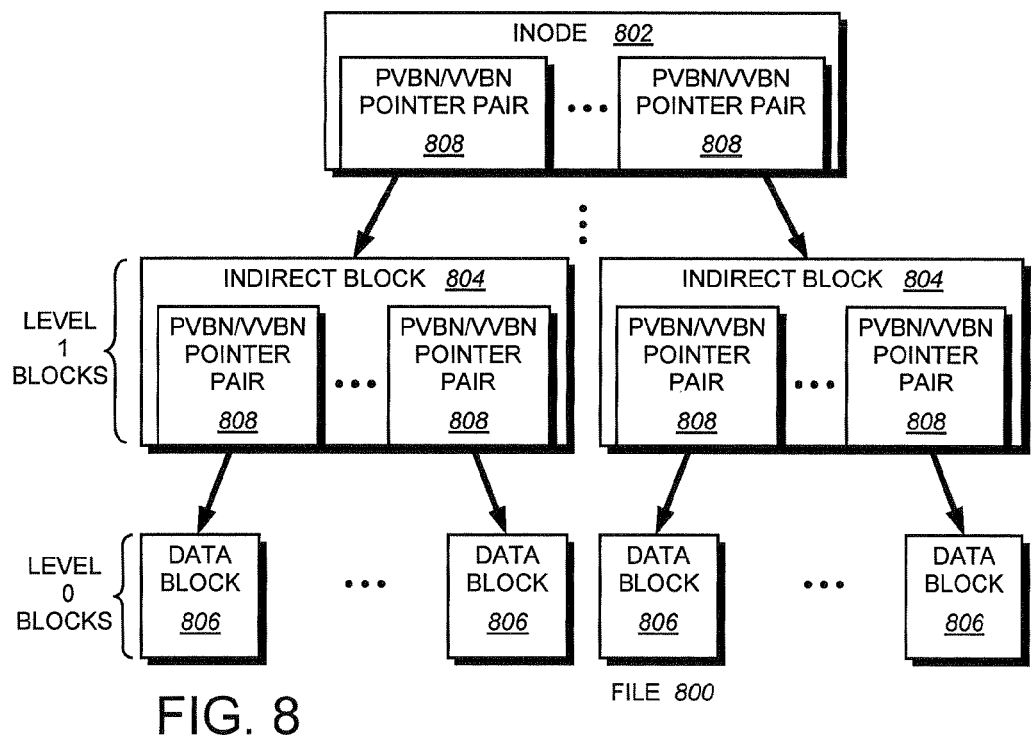
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
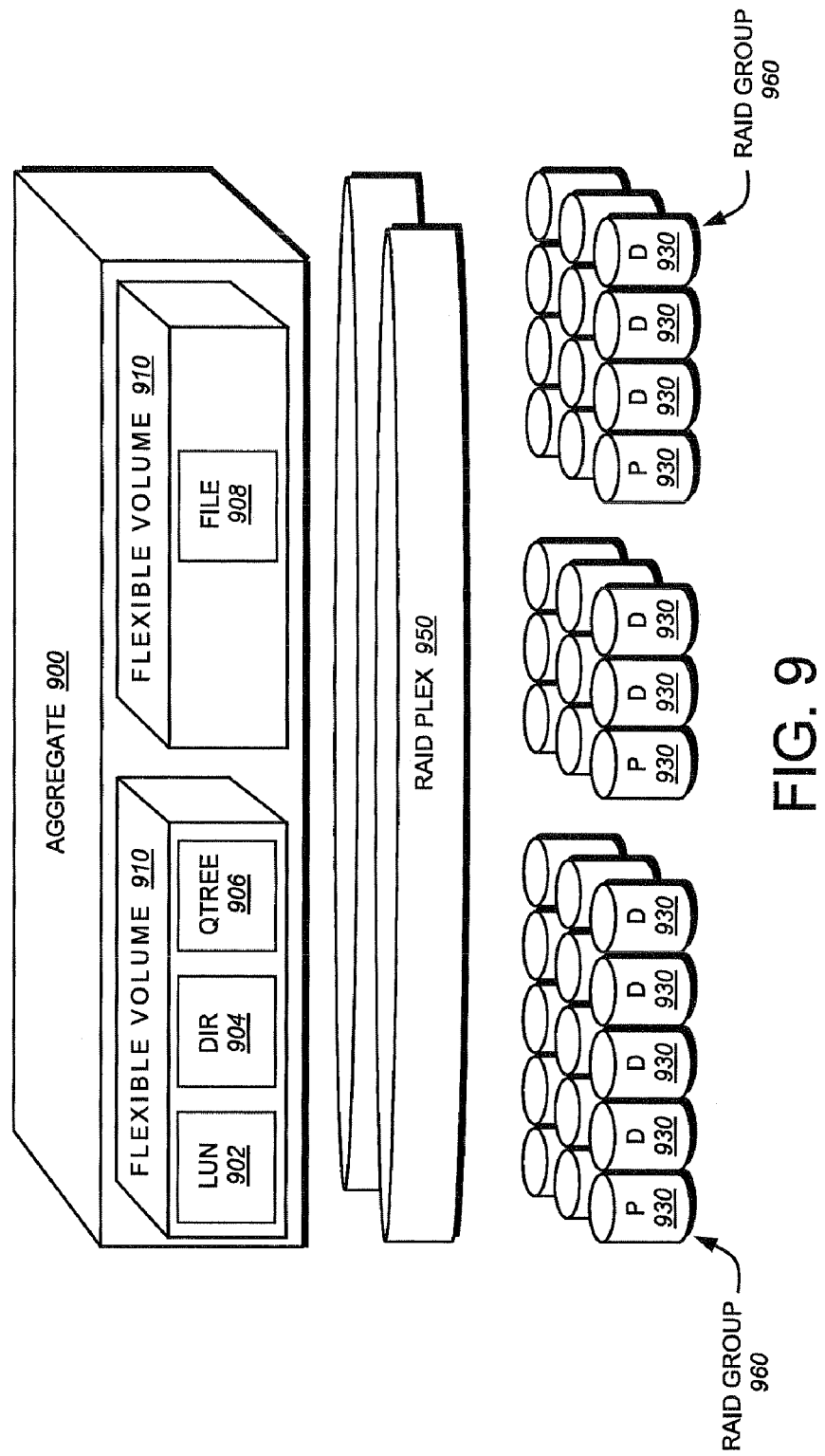
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
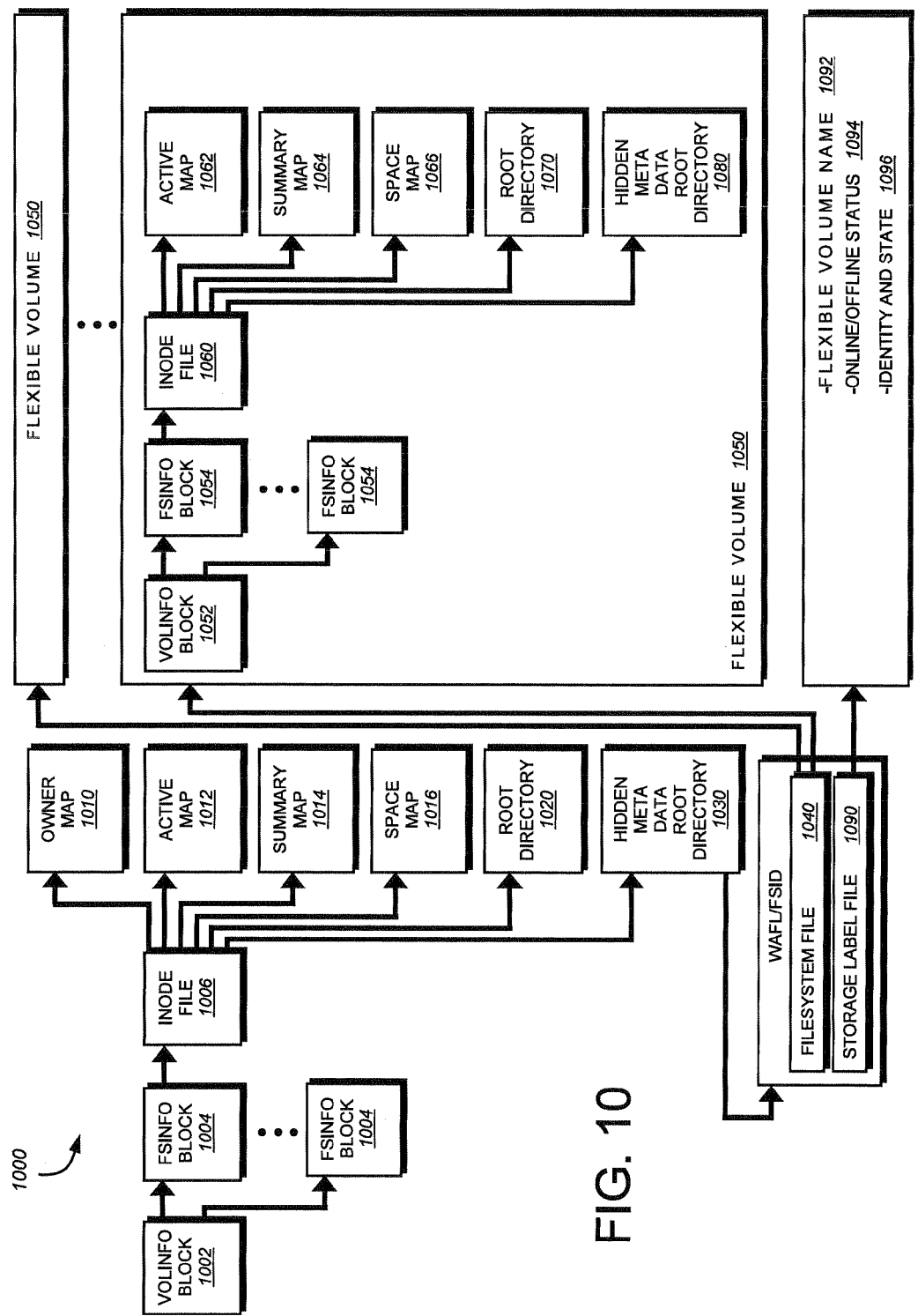
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate.

The volinfo block 1002 contains block pointers to fsinfo blocks 1004, each of which may represent a persistent consistency point image (PCPI) of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
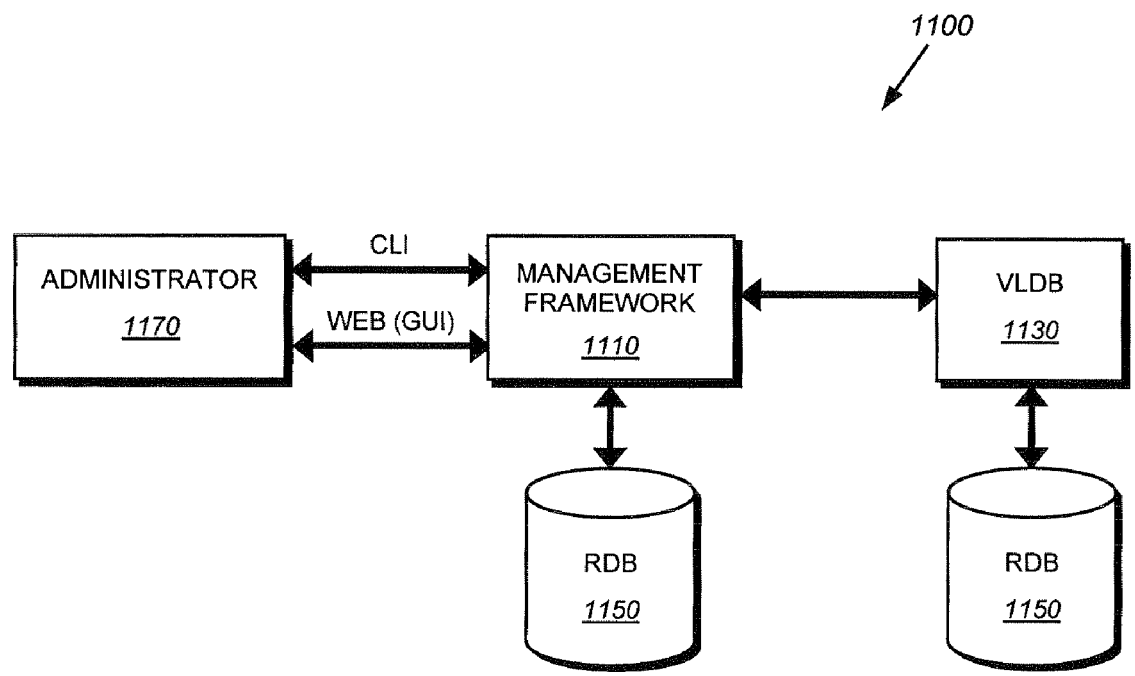
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
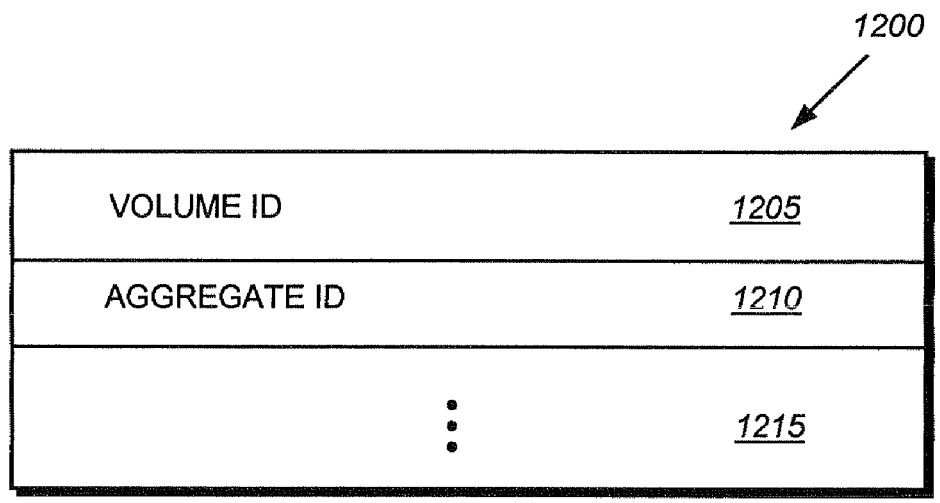
FIG. 12 is a schematic block diagram of a volume location database (VLDB) volume entry in accordance with an embodiment of the present invention.
Figure 13:
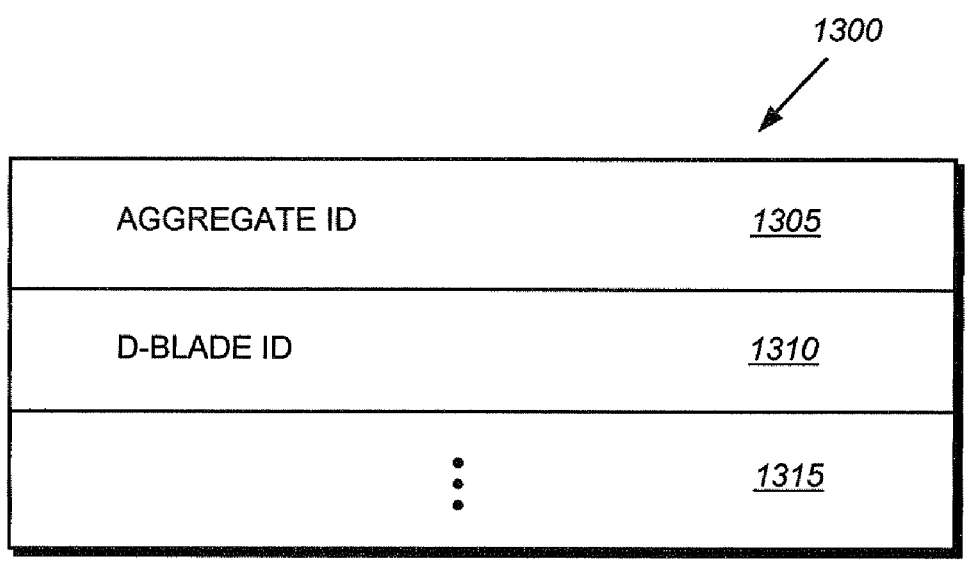
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-module ID field 1310 and, in alternate embodiments, additional fields 1315. The aggregate ID field 1305 contains an ID of a particular aggregate 900 in the cluster 100. The D-module ID field 1310 contains an ID of the D-module hosting the particular aggregate identified by the aggregate ID field 1305.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

Figure 14:
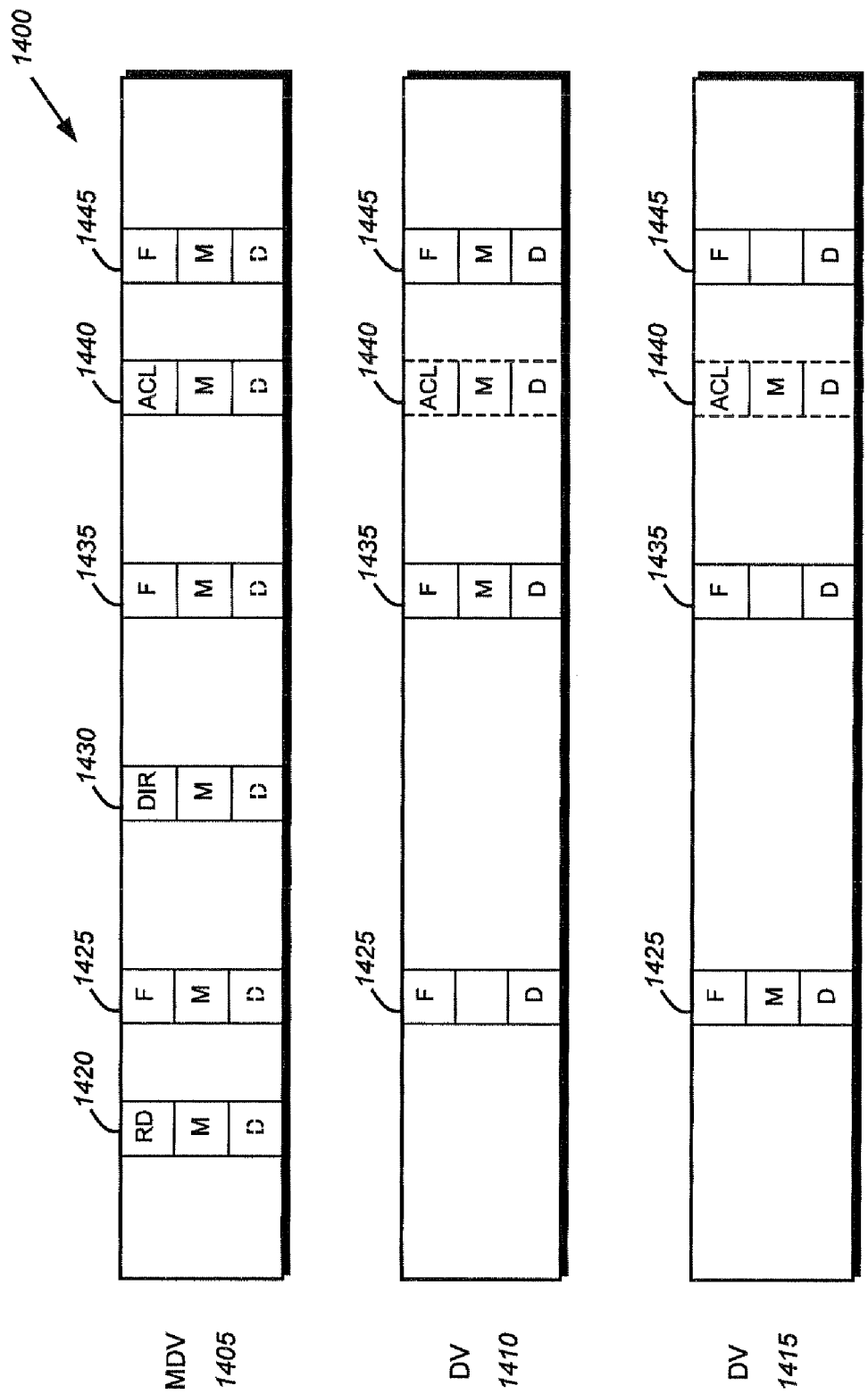
FIG. 14 is a schematic block diagram of a striped volume set (SVS) in accordance with an embodiment of the present invention.

An SVS illustratively comprises one meta-data volume (MDV) configured to store a canonical copy of certain meta-data, including access control lists and directories, associated with all data containers stored on the SVS, and one or more data volumes (DV) configured to store, at least, data content of those containers. In addition, for each data container stored on the SVS, one volume is designated a container attribute volume (CAV) and, as such, is configured to store a canonical copy of certain, rapidly-changing attribute meta-data, including time stamps and container length, associated with that container. FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. According to the illustrative architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-Module serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time stamps 620.

Figure 15:
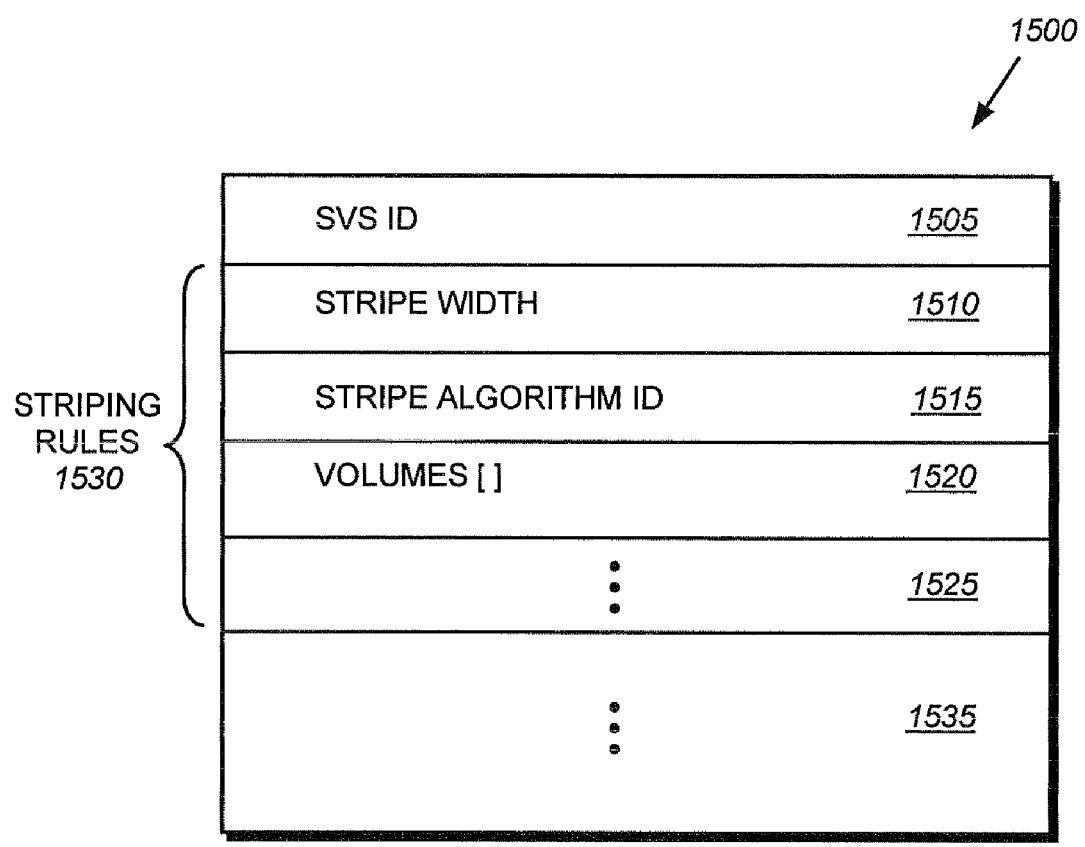
FIG. 15 is a schematic block diagram of a VLDB SVS entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

As noted, the Locate( ) function 375 is provided that enables the VSM 370 and other modules (such as those of N-module 310) to locate a D-module 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-module 310 of a node 200, where it is parsed through the multi-protocol engine 325 to the appropriate protocol server of N-module 310.

To determine the location of a D-module 350 to which to transmit a CF message 400, the N-module 310 may first retrieve a SVS entry 1500 to acquire the striping rules 1530 (and list of volumes 1520) associated with the SVS. The N-module 310 then executes the Locate( ) function 375 to identify the appropriate volume to which to direct an operation. Thereafter, the N-module may retrieve the appropriate VLDB volume entry 1200 to identify the aggregate containing the volume and the appropriate VLDB aggregate entry 1300 to ultimately identify the appropriate D-module 350. The protocol server of N-module 310 then transmits the CF message 400 to the D-module 350.

Figure 16:
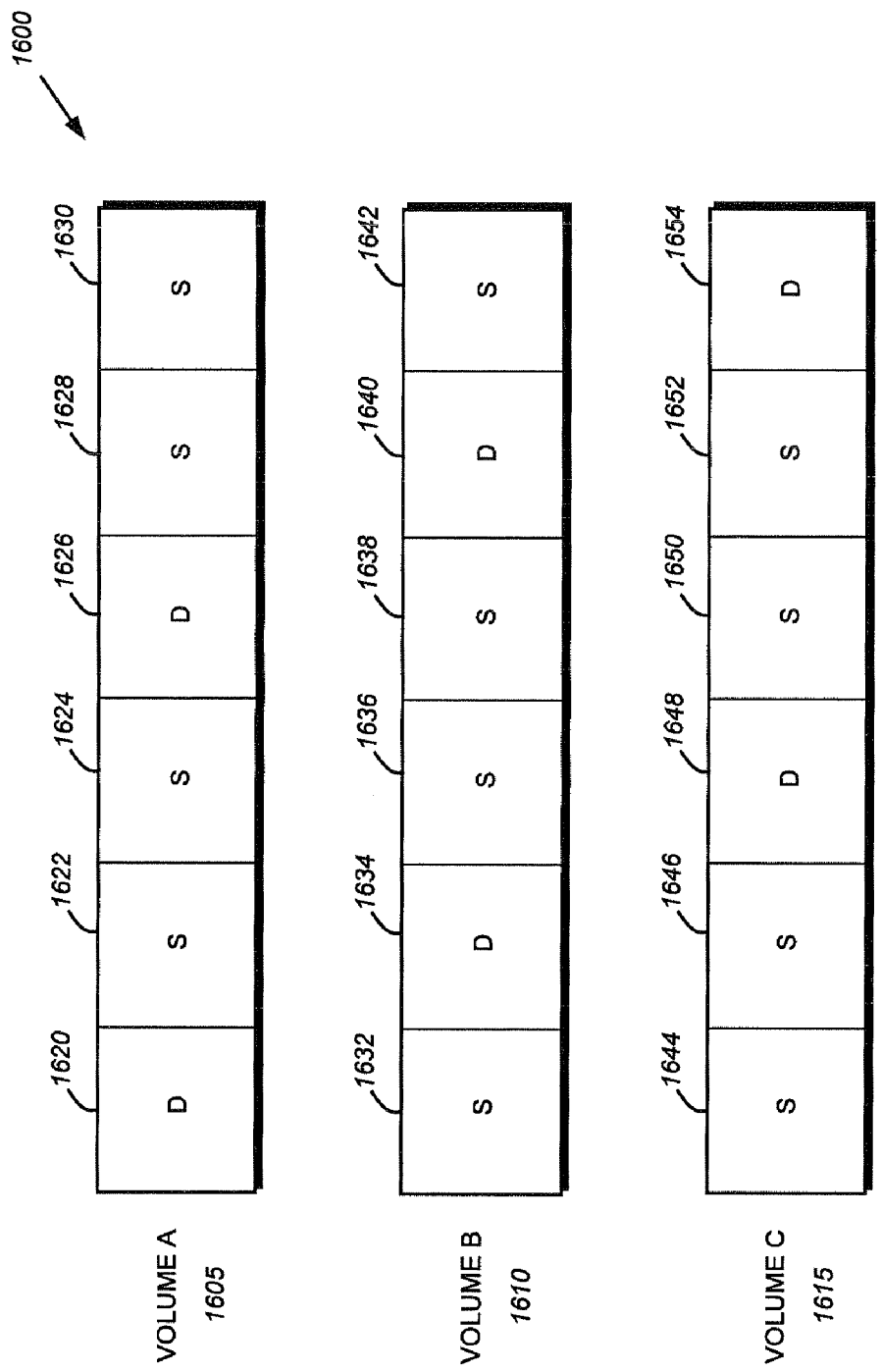
FIG. 16 is a schematic block diagram illustrating the periodic sparseness of file content stored on volumes of a SVS in accordance with an embodiment of the present invention.

FIG. 16 is a schematic block diagram illustrating the periodic sparseness of file content stored on volumes A 1605, B 1610 and C 1615 of SVS 1600. As noted, file content is periodically sparse according to the SVS striping rules, which specify a striping algorithm (as indicated by stripe algorithm ID field 1515) and a size/width of each stripe (as indicated by stripe width field 1510). Note that, in the illustrative embodiment, a stripe width is selected to ensure that each stripe may accommodate the actual data (e.g., stored in data blocks 806) referenced by an indirect block (e.g., level 1 block 804) of a file.

In accordance with an illustrative round robin striping algorithm, volume A 1605 contains a stripe of file content or data (D) 1620 followed, in sequence, by two stripes of sparseness (S) 1622, 1624, another stripe of data (D) 1626 and two stripes of sparseness (S) 1628, 1630. Volume B 1610, on the other hand, contains a stripe of sparseness (S) 1632 followed, in sequence, by a stripe of data (D) 1634, two stripes of sparseness (S) 1636, 1638, another stripe of data (D) 1640 and a stripe of sparseness (S) 1642. Volume C 1615 continues the round robin striping pattern and, to that end, contains two stripes of sparseness (S) 1644, 1646 followed, in sequence, by a stripe of data (D) 1648, two stripes of sparseness (S) 1650, 1652 and another stripe of data (D) 1654.

H. Consistency Verification of a Clustered File System

The present invention provides a system and method for performing distributed consistency verification of a clustered file system, configured to service a striped volume set (SVS). Illustratively, the SVS is implemented as a plurality of volumes within a clustered storage system comprising a plurality of nodes. A storage operating system executes on the nodes to implement the clustered file system. In the illustrative embodiment, storage operating system functions that load selected objects, such as inodes (Load_Inode ( )) and/or buffer trees (Load_Buffer ( )), are modified so that before an inode and/or buffer tree is returned to a process calling the loading function, a procedure is performed to verify the inode and any related buffer trees of a volume within the SVS as well as ensuring that the SVS is consistent with respect to the inode. The verification procedure may also repair predetermined problems with file system consistency to ensure that the file system remains stable and useable.

When the process executing within the storage operating system calls either Load_Inode( ) or Load_Buffer ( ), the modified function suspends return of the selected object until the verification procedure is performed. First, a determination is made whether a local volume consistency verification has been performed, i.e., whether the local volume is consistent regardless of the overall consistency of the SVS. If the local volume consistency verification has not been performed, then the verification procedure loads the selected inode or buffer tree and determines if it is associated with a regular file or directory. If, for example, the selected inode is a regular file inode, the verification procedure checks the associated buffer tree of the inode. This procedure insures that the buffer tree has valid pointers and that any given block does not have multiple pointers to it, as well as other file system coherence checks. The verification procedure may also correct noted errors in the file system. If the selected inode is a directory inode, the verification procedure performs a directory check.

Once the local volume consistency verification has been performed, a distributed consistency verification is performed to ensure that the selected inode is consistent among all of the constituent volumes of the SVS. The distributed consistency verification is illustratively implemented by a set of verification processes executing as part of the storage operating system.

Figure 17:
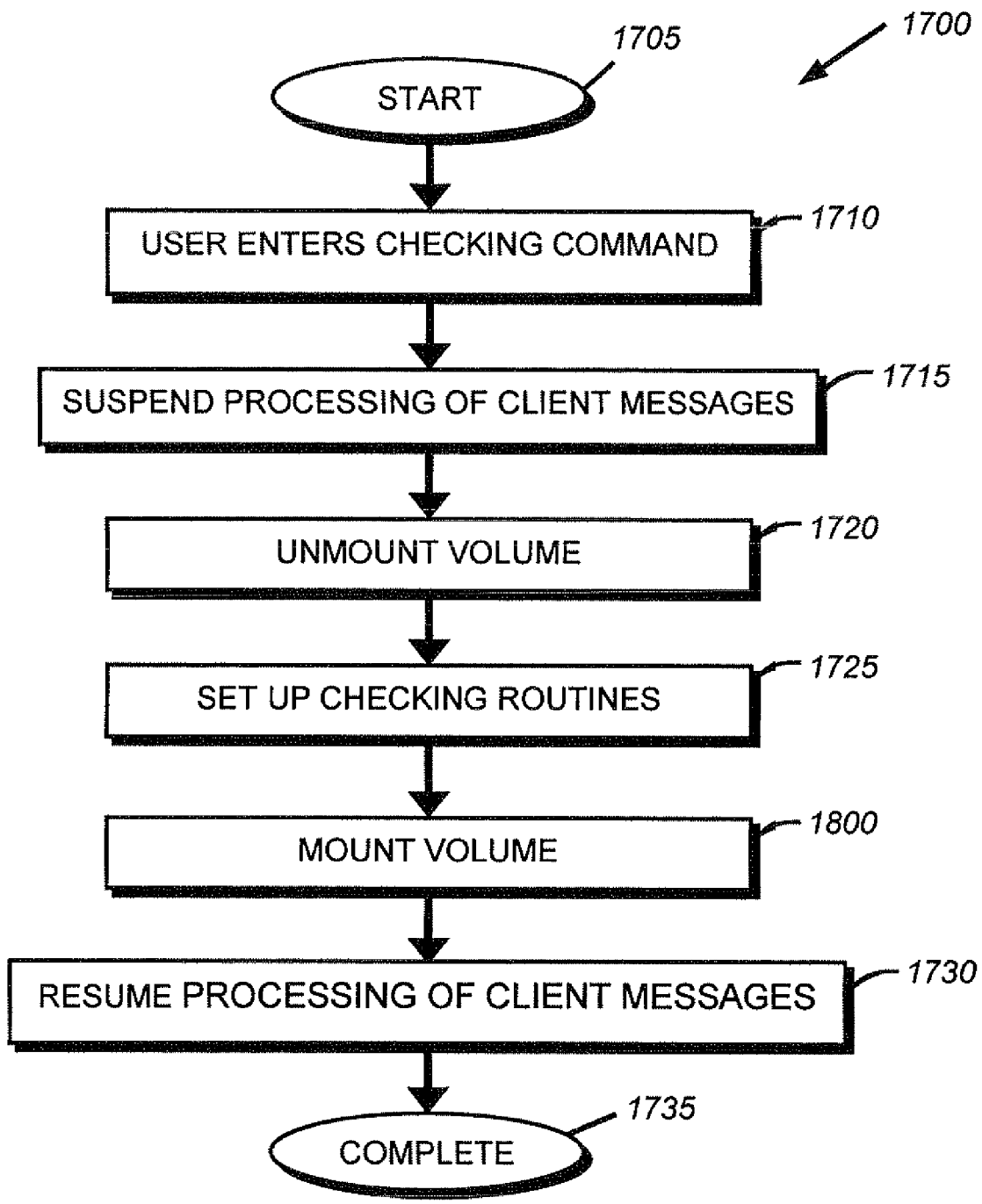
FIG. 17 is a flowchart detailing the steps of a procedure for initiating an on-line check of a distributed file system in accordance with an embodiment of the present invention.

In accordance with the illustrative embodiment, the Load_Inode( ) and Load_Buffer( ) functions 361, 362 perform local volume checks of inodes and buffer trees respectively. An initialization procedure 1700 of the illustrative distributed file system verification process 363 is shown in FIG. 17. The procedure begins in step 1705 and continues to step 1710 where a user enters a distributed file system verification (check) command to the storage system via, e.g., the CLI, GUI or any other input methodology, such as the management framework 1110. In alternate embodiments, the storage operating system can be configured so that the distributed file system check will automatically initiate upon a defined event, e.g., a crash or other error condition. Upon an entry of the check command, the file system suspends client messages in step 1715. As used herein, suspension of client messages means that the file system will accept file system commands, including, e.g., data write and/or read commands; however, while the client messages are suspended, the file system will not act upon (process) the file system command. To the process or client initiating the file system command, it appears that there is a delay in the execution of the command. In step 1720, the local volume to be checked is unmounted. In the illustrative embodiment of the Data ONTAP® storage operating system, the unmounting of a volume causes flushing of any in-core caches to the volume, thus transitioning the physical disks of the volume to a consistent state. In step 1725, checking routines of the verification process are initialized. In the illustrative embodiment, the file system 360 includes a command that retrieves an inode for further processing (Load_Inode( ) 361). To perform the on-line checking, the verification process modifies this Load_Inode( ) command 361 to include a check of the file system structure, e.g., inode or directory, being accessed. The checking routines first perform a check of the inode to be retrieved before returning the inode to the process that called Load_Inode( ). Next, the volume is remounted as described below in procedure 1800. Once the volume is remounted, the file system resumes processing client messages in step 1730 such as those messages which have either been suspended or which are later received by the file system layer are processed using the modified Load_Inode ( ) function. Thus, any request for an inode first checks that inode and associated buffer tree before returning the inode to the calling process. The procedure 1700 then completes in step 1735

Figure 18:
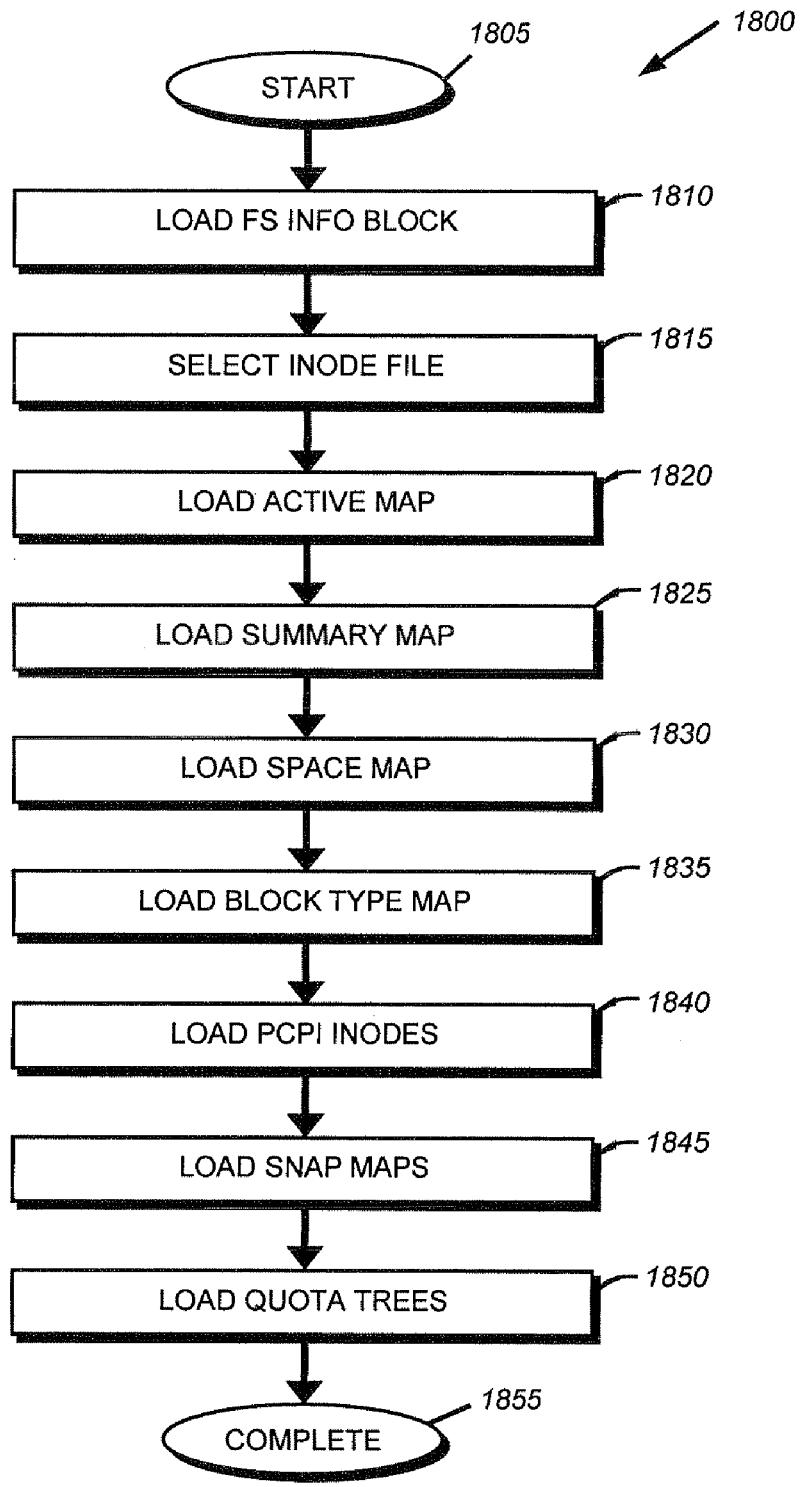
FIG. 18 is a flowchart detailing the steps of a procedure for mounting a volume in accordance with an embodiment of the present invention.

FIG. 18 illustrates a procedure 1800 performed by the file system when mounting a volume. As described herein, the file system 360 loads various metadata files using the modified Load_Inode( ) function 361. Specifically, the procedure 1800 begins in step 1805 and proceeds to step 1810 when a file system information block is first loaded into memory. The file system information block, as described above, contains metadata relating to the file system. In step 1815, an inode file is selected for loading into memory by the file system. Typically, the inode file associated with the file system information block is selected for loading, although in certain configurations, alternate inode files may be loaded. In step 1820, the active map is then loaded. The active map is a data structure that is utilized by the file system to track which blocks are used by the active file system. It should be noted that during this and other subsequent load operations, the modified Load_Inode( ) function is utilized by the file system. Thus, during the mounting of the volume by the file system, the various inodes and directories associated with the file system files are verified. Next, in step 1825, the summary map is loaded. The summary map stores metadata associated with determining which blocks are used by any snapshots stored by the file system. "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken, including, for example, a current copy of the file system information block 105, as described above. The terms "PCPI" and "snapshot" shall be used interchangeably through out this patent without derogation of Network Appliance's trademark rights.

In step 1830, the space map is loaded. The space map is a map of the various blocks of the file system noting which are utilized by the active file system and which are free to be allocated. In step 1835, the block type map is loaded. The block type map identifies the use of a block. For example, a block could be utilized as a data holding block, or as a directory block. The PCPI inodes are loaded in step 1840 and, thereafter the snap maps are loaded in step 1845. In step 1850, the quota trees are loaded. A quota tree (or qtree) is a subset of a volume that is defined by a directory. A qtree is essentially a mini-volume with the property that every object within the qtree has a qtree ID in its inode. In the context of quotas, the maximum amount of storage resources available to a qtree can be specified. Thus, if it is desired to limit storage for a project having many users, it would be appropriate to specify a quota on a qtree instead of an actual security object. Multiple qtrees can be created on a single volume, with each qtree having a different size (as desired). However, the qtree can also be created without a limit (quota). This information is scanned and identified by the file system to facilitate identification of the applicable qtree for, e.g., a file on a volume.

As the file system metadata files are loaded using the modified Load_Inode( ) function 361, each file is checked in accordance with the teachings of this invention. Thus, by the completion of the volume mount procedure 1800, all required file system metadata files have been checked. Note that some files, such as the inode file, which contain a large quantity of data may be only selectively checked so as to reduce processing time and overhead.

Figure 19:
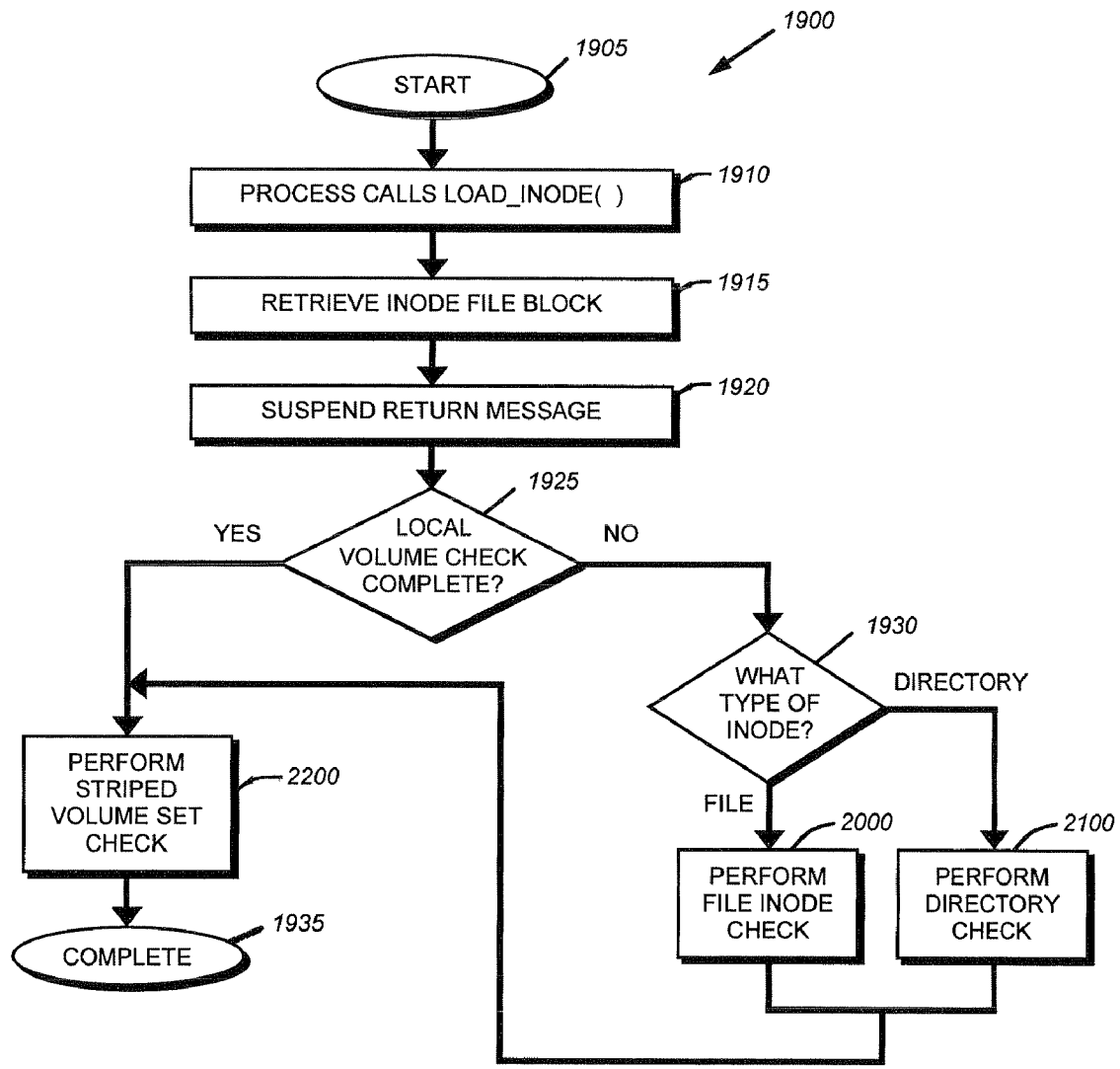
FIG. 19 is a flowchart detailing the steps of a procedure for processing a Load_Inode( ) function call in accordance with an inode of the present invention.

FIG. 19 illustrates a procedure 1900 performed by the verification process 363 when performing an on-line verification file system. The procedure 1900 begins in step 1905 and continues to step 1910 where a process within the storage operating system calls the Load_Inode( ) function. As the Load_Inode( ) function 361 has been modified, the typical Load_Inode( ) functionality has been supplemented by the procedure described herein. In step 1915, the inode file block requested with the Load_Inode( ) function is retrieved. The inode file block could be in-core if it has been recently utilized, or may be physically located on disk. If the inode file block is on disk, then the file system retrieves the data block from disk by sending one or more appropriate commands to the RAID and disk driver layers of the storage operating system. In step 1920, a return message to the process that called the Load_Inode( ) function is suspended. Suspension of the return message illustratively lasts for the duration of the check of this particular inode. Thus, although it appears to the process calling the Load_Inode( ) command, that the function has some associated latency. That is, although on-line verification of the file system proceeds with minimal disruption of service. That is, although requests for inodes are delayed while the inodes are checked, the file system, as a whole, remains on-line and available for use. By "on-line" it is meant that the file system is accessible by users for read and/or write functions.

In step 1925 a determination is made whether the local volume check has been completed for this particular inode. This may occur by, for example, examining a progress indicator, described further below, or by examining a bit set within the inode. In accordance with the illustrative embodiment, each of the local volumes of the SVS is checked prior to checking the overall consistency of the SVS. If the local volume check has completed, i.e., the individual inode has been verified on the volume being serviced, the procedure branches to step 2200 and performs a SVS check. The procedure then completes in step 1935.

However, if in step 1925 it is determined that a local volume check has not completed, then the procedure 1900 branches to step 1930 where the file system verification routine determines what type of inode has been requested. If the inode requested is a file inode, then the routine performs a file inode check as described in procedure 2000. However, if the inode requested is a directory inode, then the verification routine will perform a directory check as described in procedure 2100.

Figure 20:
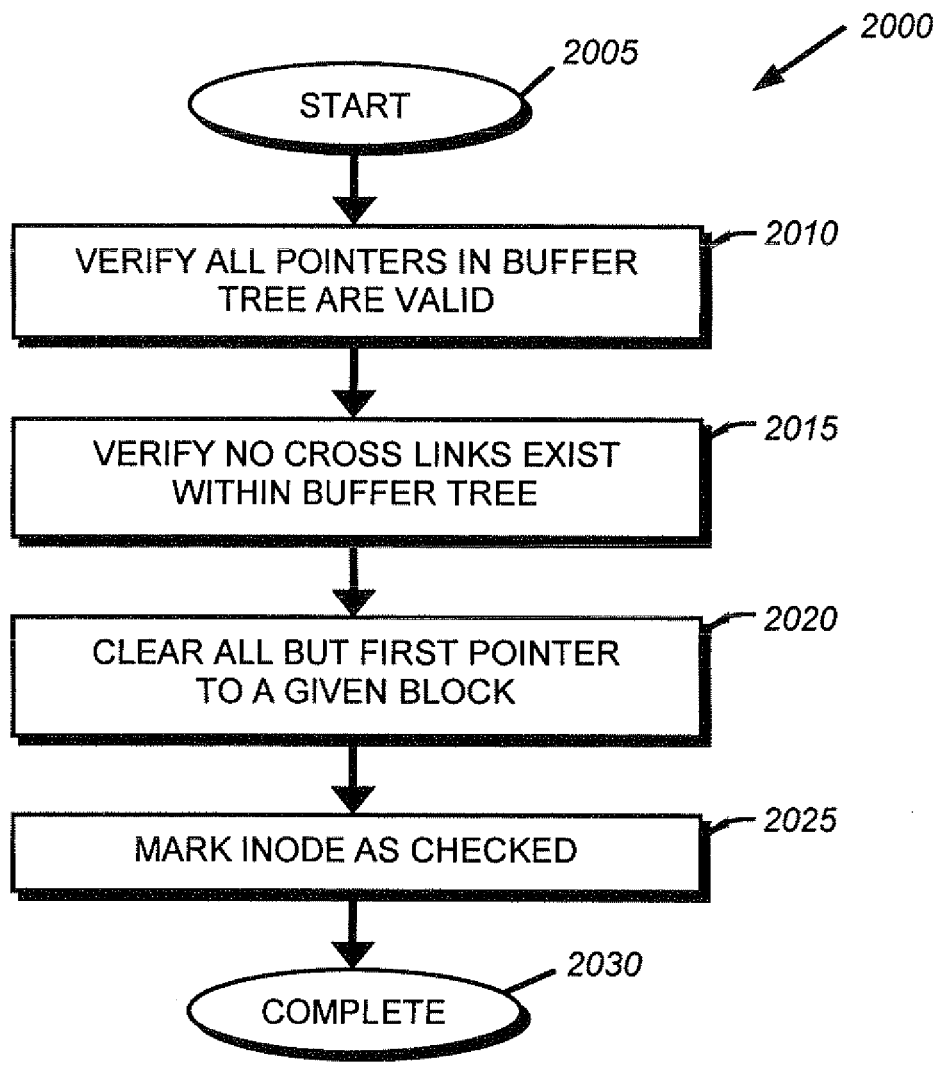
FIG. 20 is a flowchart detailing the steps of a procedure for performing a file inode check in accordance with an embodiment of the present invention.

To check an inode, the buffer tree associated with the inode is verified in accordance with procedure 2000 shown in FIG. 20. Procedure 2000 illustratively operates by traversing the various branches of the buffer tree and verifying certain key items. The procedure 2000 begins in step 2005 and continues in step 2010, where the inode check verifies that all pointers in the buffer tree are valid. If a pointer is directed to an invalid block, the pointer is cleared.

Next, in step 2015, the inode checking process verifies that no cross-links exist within the buffer tree. If a block has multiple pointers to it, the inode checking routine clears all but the first pointer (step 2020). Thus, the first block to point to a given block is retained with any other blocks having their pointers removed. Finally, the inode is marked as checked (step 2025) by, e.g., modifying a tracking file, described further below, or by modifying a bit within the inode's metadata. The procedure 2000 then completes in step 2030.

Figure 21:
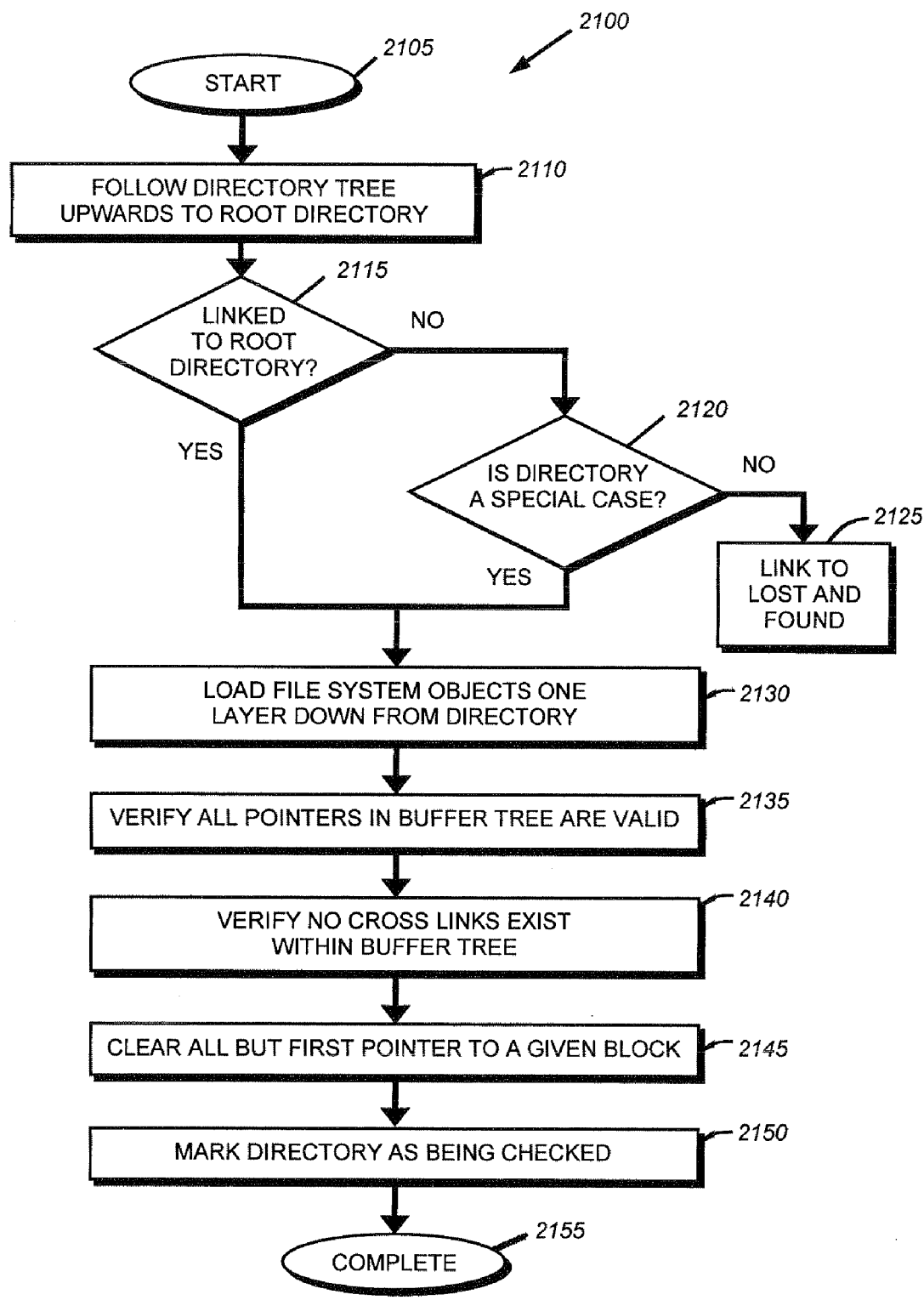
FIG. 21 is a flowchart detailing the steps of a procedure for performing a directory inode check in accordance with an embodiment of the present invention.

FIG. 21 illustrates procedure 2100 performed by the verification process when checking a directory. The procedure 2100 begins in step 2105 and continues to step 2110 where the verification process follows the directory tree "upwards" to the root directory. For example, if the sub directory of the path "/dir1/dir2/sub" is checked, the verification process first moves to the dir2 directory and then to the dir1 directory before finding the root directory. Traversal of the directory tree can be accomplished by, for example, accessing a special entry in a directory that identifies the directory's parent directory. In one embodiment, this special entry is denoted ".." (dot-dot) within a directory.

After the directory tree has been traversed upwards as far as possible, the process determines if the directory is linked to the root directory of the volume (step 2115). If the directory is not linked to the root directory, the process determines if the directory is a special directory that should not be linked to the root directory in step 2120. An example of such a special directory would be a meta directory storing file system metadata. Metadirectories are further described in United States patent application Ser. No. 10/191,705 entitled METADATA DIRECTORY FILE SYSTEM, by Douglas Santry, et al., now issued as U.S. Pat. No. 7,386,546 on Jun. 10, 2008. If the directory is not a special case, then the directory is linked to a lost and found directory (step 2125) for later processing. The lost and found directory can be accessed by a user or administrator of the storage system to determine what further actions should be taken with respect to these directories.

If the directory does link to the root directory or if the directory is a special case that does not need to link to the root directory, the verification process then loads the file system objects that are one level beneath the directory (step 2130). These file system objects include, for example, subdirectories of the selected directory or files stored in the selected directory.

Next, the verification process performs the above-described checks of the buffer trees associated with the directory. In step 2135, the process verifies that all pointers within each buffer tree are valid. If there are invalid pointers, i.e., pointers that point to invalid inodes or file data blocks, the pointers are cleared. In step 2140, the process checks that no cross links exist within the buffer trees. If multiple blocks point to a given block, the directory check procedure 2100 clears all but the first pointer in step 2145. Finally, in step 2150, the directory is marked has having been checked. This marking can be accomplished by the use of a tracking file, described further below. The procedure 2100 then completes in step 2155.

Figure 22:
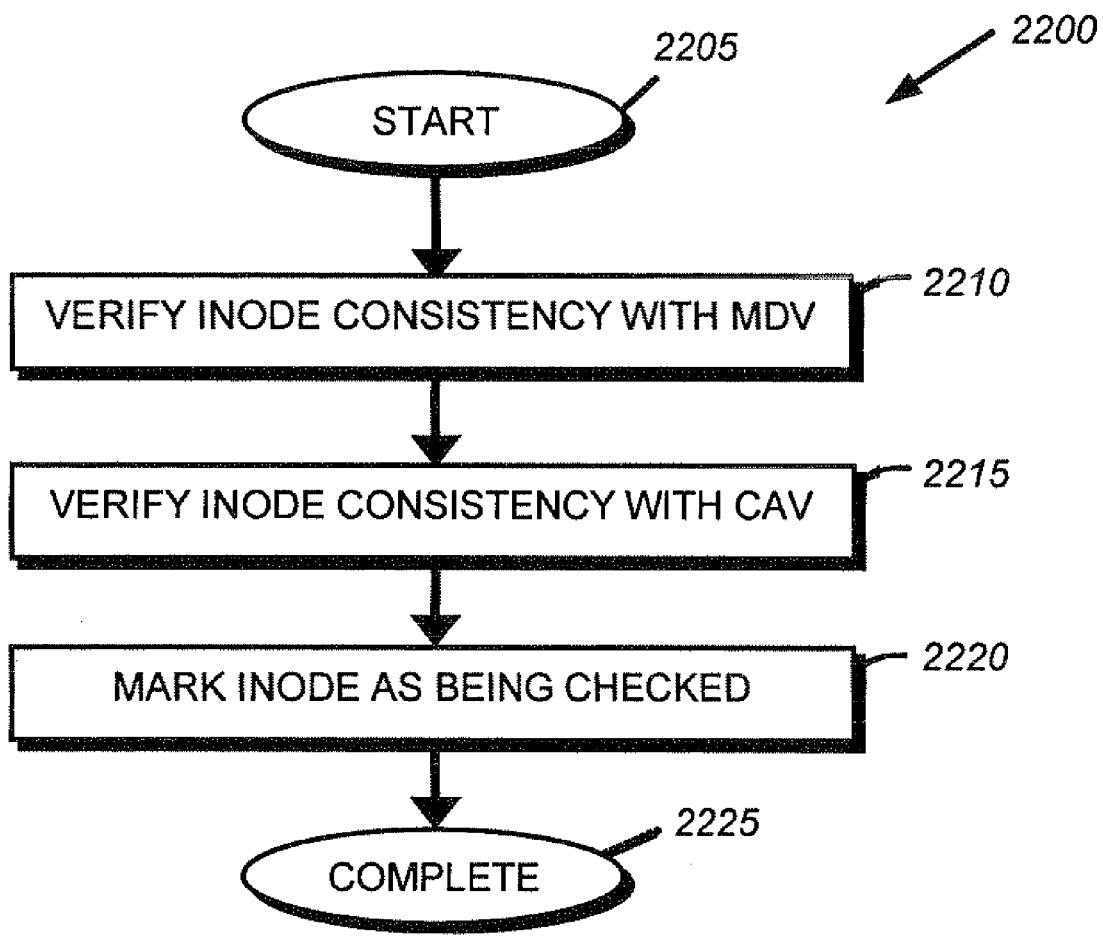
FIG. 22 is a flowchart detailing the steps of a procedure for performing a distributed striped volume set consistency check in accordance with an embodiment of the pre-sent invention.

FIG. 22 is a flowchart detailing the steps of a procedure for performing a SVS check in accordance with an embodiment of the present invention. The procedure 2200 begins in step 2205 and continues to step 2210 where the verification process verifies the inode's consistency with the MDV of the SVS by, e.g., examining the metadata stored within the MDV and comparing it with the locally stored metadata and/or the current state of the data container. Should the MDV's metadata be inconsistent with the current state of the data container, the verification process may issue an error message alerting the administrator of the inconsistency. In alternate embodiments, the verification process may update the MDV so that the MDV is consistent with the state of the file system. Then, in step 2215, the verification process verifies the inode's consistency with the CAV by, e.g., comparing the inode's metadata with that stored in the CAV. Should on inconsistency be detected, the inode's metadata may be updated so that it is consistent with the CAV'S. Then, in step 2220, the inode is marked as being checked before the procedure 2200 completes in step 2225.

Figure 23:
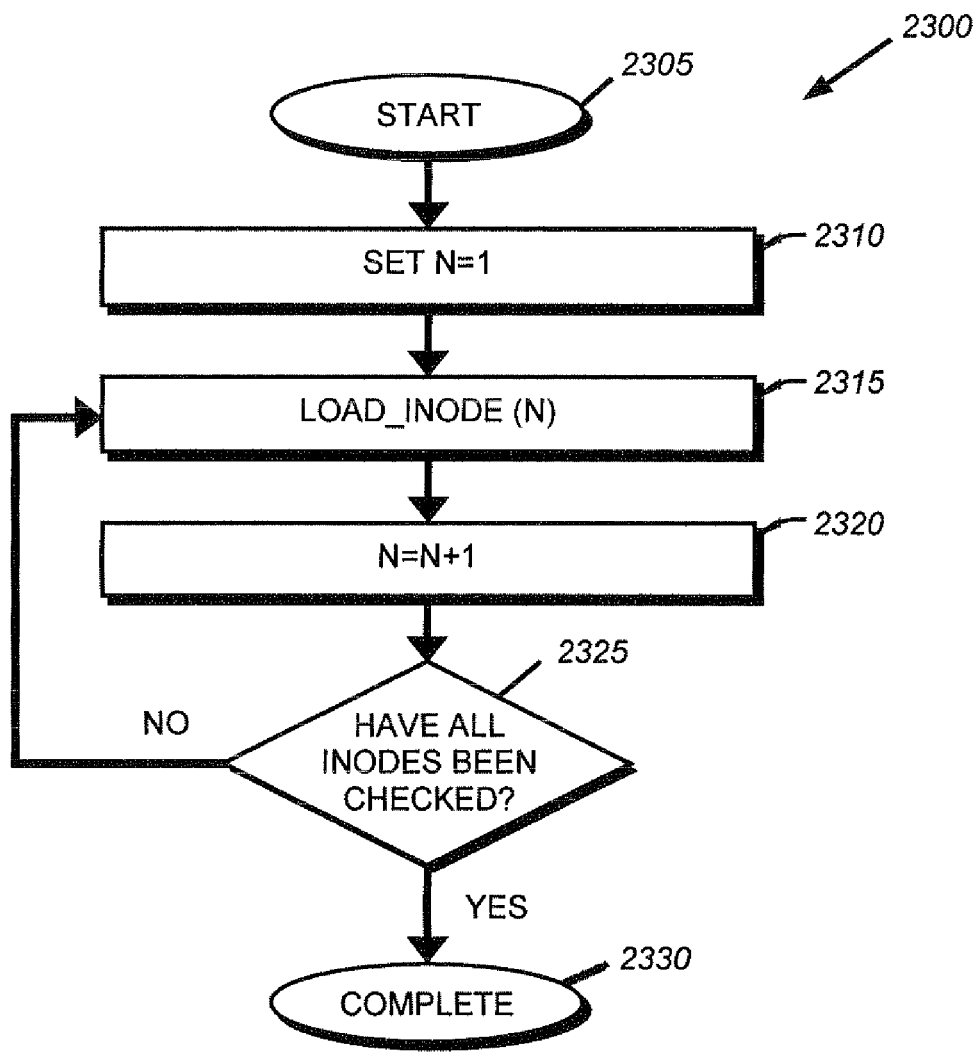
FIG. 23 is a flowchart detailing the steps of procedure for sequentially loading inodes to ensure that all inodes are checked in accordance with an embodiment of the present invention.

To ensure that all inodes of the file system are checked in a timely manner, a background process (not shown) is initiated by the file system verification process. By "background process" it is meant generally a process executing at a low priority within the storage operating system that performs a given function with no user input. The procedure 2300 performed by this background process is shown in FIG. 23. The procedure 2300 begins in step 2305. A counter (N) is initially set to a value of one (step 2310). The background process then calls the Load_Inode( ) function requesting the Nth inode, i.e. Load_Inode (N) in step 2315. As the Load_Inode( ) function has been modified to incorporate checking, the requested inode is checked. Next, the counter increments (e.g. increased by one) in step 2320. The background process determines if all inodes in the file system have been checked in step 2325. This check can be accomplished by utilizing the file system tracking files, described below. If all inodes have been checked, the procedure completes (step 2330) and exits. Otherwise, the procedure loops back to function step 2315. Thus, this background process serially requests inodes using the Load_Inode( ) function, which causes the inodes and associated buffer trees to be checked.

In the illustrative embodiment, the file system verification process creates a file within the file system being checked. This file stores information relating to which inodes, buffer trees and directories have been checked by the file system process. By storing the status within a file on the active file system, memory is saved. In known examples of file system checking programs, the status information relating to the progress of the file system check is stored in the memory of the computer executing the file system check. When the file system is large and includes a substantial number of inodes and directories, the memory requirement to store the progress information. Thus, by storing the information on files in the file system, computer memory resources can be preserved.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for performing verification of a striped volume set, comprising:
    executing an operating system by a computer servicing a plurality of data containers, the plurality of data containers organized as the striped volume set that includes a plurality of constituent volumes;
    receiving a request at the operating system directed to a data container of the striped volume set;
    in response to receiving the request directed to the data container, determining whether the data container has been checked locally;
    in response to determining that the data container has not been checked locally, performing a local check of the data container;
    performing a striped volume set check to ensure that the data container is consistent among all the plurality of the constituent volumes by verifying that locally stored metadata associated with the data container is consistent with metadata stored within a container attribute volume of the striped volume set, wherein the container attribute volume is designated to the data container; and
    returning a message to the operating system in response to verifying the striped volume set.

2. The method of claim 1, wherein the data container comprises an inode.

3. The method of claim 1, wherein the data container comprises a buffer tree.

4. The method of claim 1, wherein performing a striped volume set check comprises:
    verifying that the locally stored metadata associated with the data container is consistent with metadata stored within a metadata volume of the striped volume set.

5. The method of claim 1, wherein performing the local check comprises:
    performing a file inode check of the data container.

6. The method of claim 1, wherein performing the local check comprises:
    performing a check of a buffer tree associated with an inode of the data container.

7. The method of claim 1, further comprising:
    modifying a function to load the data container to perform a check of the data container in response to the request directed to the data container.

8. A system configured to perform verification of a striped volume set, comprising:
    a computer configured to execute an operating system, the computer further configured to service a plurality of data containers organized as the striped volume set that include a plurality of constituent volumes serviced by the computer;
    the operating system configured to receive a request directed to a data container of the striped volume set;
    the operating system further configured to determine, in response to receiving the request directed to the data container, whether the data container has been checked locally;
    the operating system further configured to perform, in response to determining that the data container has not been checked locally, a local check of the data container;
    the operating system further configured to perform a striped volume set check to ensure that the data container is consistent among all the plurality of the constituent volumes by verifying that locally stored metadata associated with the data container is consistent with metadata stored within a container attribute volume of the striped volume set, wherein the container attribute volume is designated to the data container; and
    the operating system further configured to receive a message in response to verifying the striped volume set.

9. The system of claim 8, wherein the data container comprises an inode.

10. The system of claim 8, wherein the data container comprises a buffer tree.

11. The system of claim 8, wherein performing a striped volume set check comprises:

the operating system further configured to verify that the locally stored metadata associated with the data container is consistent with metadata stored within a metadata volume of the striped volume set.

12. The system of claim 8, wherein the local check of the data container comprises:
the operating system further configured to perform a file inode check of the data container.

13. The system of claim 8, wherein the local check of the data container comprises:
the operating system further configured to perform a check of a buffer tree associated with an inode of the data container.

14. The system of claim 8, wherein a set of verification processes of the operating system is configured to perform the verification of the striped volume set.

15. The system of claim 8, wherein the computer comprises a network element and a disk element.

16. The system of claim 8, further comprising:
the operating system further configured to organize the plurality of constituent volumes into a single addressable storage space.

17. A non-transitory computer-readable media containing executable program instructions executed by a processor, comprising:
program instructions that execute an operating system by a computer servicing a plurality of data containers, the plurality of data containers organized as a striped volume set that includes a plurality of constituent volumes;
program instructions that receive a request directed to a data container of the striped volume set;
program instructions that determine, in response to receiving the request directed to the data container, whether the data container has been checked locally;
program instructions that perform, in response to determining that the data container has not been checked locally, a local check of the data container;
program instructions that perform a striped volume set check to ensure that the data container is consistent among all the plurality of constituent volumes by verifying that locally stored metadata associated with the data container is consistent with metadata stored within a container attribute volume of the striped volume set, wherein the container attribute volume is designated to the data container; and
program instructions that return a message to the operating system in response to verifying the striped volume set.

18. A system configured to verify a striped volume set, comprising:
means for executing an operating system by a computer servicing a plurality of data containers, the plurality of data containers organized as the striped volume set on one or more storage devices operatively connected to the computer, wherein the striped volume set includes a plurality of constituent volumes;
means for receiving a request directed to a data container of the striped volume set;
means for determining, in response to receiving the request directed to the data container, whether the data container has been checked locally;
means for performing, in response to determining that the data container has not been checked locally, a local check of the data container;
means for performing a striped volume set check to ensure that the data container is consistent among all the plurality of the constituent volumes by verifying that locally stored metadata associated with the data container is consistent with metadata stored within a container attribute volume of the striped volume set, wherein the container attribute volume is designated to the data container; and
means for returning a message to the operating system in response to verifying the striped volume set.

19. The system as in claim 18, further comprising:
means for storing the data container as the striped volume set across one or more of the plurality of constituent volumes.

20. The system as in claim 18, further comprising:
means for using a buffer tree as the data container.

21. The system as in claim 18, further comprising:
means for verifying an inode of the data container.

22. The system as in claim 18, further comprising:
means for using an attached array of writable storage device media as the one or more storage devices.

23. The system as in claim 18, further comprising:
means for using an optical media as the one or more storage devices.

24. The system as in claim 18, further comprising:
means for using a DVD media as the one or more storage devices.

25. The system as in claim 18, further comprising:
means for using a magnetic tape as the one or more storage devices.

26. The system as in claim 18, further comprising:
means for using an electronic random access memory as the one or more storage devices.

27. The system as in claim 18, further comprising:
means for using a micro-electro mechanical media as the one or more storage devices.

28. The system as in claim 18, further comprising:
means for using a magnetic disk as the one or more storage devices.

29. The system as in claim 18, further comprising:
means for using a RAID array of magnetic disks as the one or more storage devices.

30. A data storage system, comprising:
a computer configured to execute an operating system, the computer configured to service a plurality of data containers organized as a striped volume set that includes a plurality of constituent volumes;
a process of the operating system configured to call a loading function of the operating system, the process further configured to issue a request directed to a data container of the striped volume set on one or more persistent storage devices operatively connected to the computer;
the operating system further configured to determine, in response to the request directed to the data container, whether the data container has been checked locally;
the operating system further configured to perform, in response to determining that the data container has not been checked locally, a local check of the data container;
the operating system further configured to perform a striped volume set check to ensure that the data container is consistent among all the plurality of the constituent volumes by verifying that locally stored metadata associated with the data container is consistent with metadata stored within a container attribute volume of the striped volume set, wherein the container attribute volume is designated to the data container, and wherein the striped volume set check is performed before the data container is returned to the process calling the loading function; and the operating system further configured to return a message to the process in response to verifying the striped volume set.

31. The data storage system as in claim 30, where the striped volume set check further comprises:
the operating system further configured to verify that the locally stored metadata associated with the data container is consistent with metadata stored within a metadata volume of the striped volume set.

32. The data storage system as in claim 30, wherein the data container comprises a buffer tree.

33. The data storage system as in claim 30, wherein the data container comprises an inode.

34. The data storage system as in claim 30, wherein the one or more persistent storage devices comprises an attached array of writable storage device media.

35. The data storage system as in claim 30, wherein the one or more persistent storage devices comprises an optical media.

36. The data storage system as in claim 30, wherein the one or more persistent storage devices comprises a DVD media.

37. The data storage system as in claim 30, wherein the one or more persistent storage devices comprises a magnetic tape.

38. The data storage system as in claim 30, wherein the one or more persistent storage devices comprises an electronic random access memory.

39. The data storage system as in claim 30, wherein the one or more persistent storage devices comprises a micro-electro mechanical media.

40. The data storage system as in claim 30, wherein the one or more persistent storage devices comprises a magnetic disk.

41. The data storage system as in claim 30, wherein the one or more persistent storage devices comprises a RAID array of magnetic disks.

42. A storage system, comprising:
means for executing an operating system of a computer, the computer configured to service a plurality of data containers organized as a striped volume set that includes a plurality of constituent volumes;
means for calling a loading function of the operating system to load a data container of the striped volume set on one or more persistent storage devices operatively connected to the computer;
means for determining, in response to loading the data container, whether the data container has been checked locally;
means for performing, in response to determining that the data container has not been checked locally, a local check of the data container;
means for performing a striped volume set check to verify that the data container is consistent among all the plurality of constituent volumes by verifying that locally stored metadata associated with the data container is consistent with metadata stored within a container attribute volume of the striped volume set, wherein the container attribute volume is designated to the data container, and wherein the striped volume set check is performed before the data container is returned to the means for calling; and
means for sending a return message in response to verifying the striped volume set.

* * * * *